(12) United States Patent (10) Patent No.: US 12,587,594 B2
Yang (45) Date of Patent: Mar. 24, 2026

(54) EARPHONE DEVICE AND COMMUNICATION METHOD

(71) Applicant: Nanjing Zgmicro Company Limited, Nanjing (CN)

(72) Inventor: Xiaodong Yang, Nanjing (CN)

(73) Assignee: Nanjing Zgmicro Company Limited, Nanjing (CN)

( * ) Notice: Subject to any disclaimer, the term of this patent is extended or adjusted under 35 U.S.C. 154(b) by 784 days.

(21) Appl. No.: 17/736,763

(22) Filed: May 4, 2022

(65) Prior Publication Data

US 2022/0286538 A1 Sep. 8, 2022

Related U.S. Application Data

(63) Continuation of application No. PCT/CN2020/126069, filed on Nov. 3, 2020.

(30) Foreign Application Priority Data

Nov. 5, 2019 (CN) .......................... 201911073317.7
Oct. 29, 2020 (CN) .......................... 202011183256.2

(51) Int. Cl.
*H04M 1/02* (2006.01)
*G10K 11/178* (2006.01)
*H04R 3/00* (2006.01)

(52) U.S. Cl.
CPC ......... *H04M 1/0202* (2013.01); *G10K 11/178* (2013.01); *H04R 3/00* (2013.01); *H04R 2430/01* (2013.01); *H04R 2460/01* (2013.01)

(58) Field of Classification Search
CPC ............. H04M 1/0202; H04M 1/6058; H04M 1/72469; H04M 9/082; H04M 1/72412;
(Continued)

(56) References Cited

U.S. PATENT DOCUMENTS

2002/0037746 A1* 3/2002 Osano ................. H04M 1/6058
455/569.1
2016/0191093 A1* 6/2016 Larsen ................ H04M 1/6066
455/41.2
2018/0146098 A1* 5/2018 Wu ......................... H04M 9/08

FOREIGN PATENT DOCUMENTS

CN 105225662 A 1/2016
CN 105530391 A 4/2016
(Continued)

OTHER PUBLICATIONS

First Office Action for Chinese Application No. 202011183256.2, mailed Jun. 28, 2021.
(Continued)

*Primary Examiner* — Diane D Mizrahi
*Assistant Examiner* — Jing Gao
(74) *Attorney, Agent, or Firm* — Zhong Law, LLC

(57) ABSTRACT

An earphone device, a communication device, a communication system and a communication method are described. The communication method comprises: collecting a local audio signal comprising a local ambient sound, and performing audio processing before transmission on the local audio signal to obtain a first audio signal when a local audio is allowed to be played and/or talking is allowed; performing audio processing before playback on the first audio signal to obtain a second audio signal, and playing the second audio signal when the local audio is allowed to be played; transmitting the first audio signal to an external device when the talking is allowed.

16 Claims, 11 Drawing Sheets

(58) Field of Classification Search

CPC ............. H04M 1/6066; H04M 1/6016; H04M 2250/02; H04M 1/6033; H04M 1/19; H04M 1/6008; H04M 9/08; H04M 19/044; H04M 1/72463; H04M 1/6091; H04M 3/533; H04M 1/72513; H04M 1/72466; H04M 1/275; H04M 1/27; H04M 1/0235; H04M 2203/2038; H04M 1/575; H04M 1/66; H04M 1/20; H04M 2203/551; H04M 7/0048; H04M 2203/4536; G10K 11/178; G10K 2210/108; G10K 2210/51; G10K 11/17823; G10K 11/17873; G10K 11/17885; G10K 2210/1081; G10K 11/17881; G10K 11/17857; G10K 11/17837; G10K 11/17827; H04R 3/005; H04R 2201/107; H04R 2410/05; H04R 1/1041; H04R 1/10; H04R 1/1083; H04R 1/20; H04R 3/00; H04R 2430/01; H04R 2460/01; H04R 2420/07; H04R 5/04; H04R 25/554; H04R 25/505; H04R 5/033; H04R 2225/43; H04R 3/12; H04R 1/406; H04R 2499/11; H04R 2499/13; H04R 2225/41; H04R 29/001; H04R 1/08; H04R 9/06; H04R 2225/55; H04R 3/02; H04R 1/403; H04R 25/609; H04R 19/04; H04R 1/2803; H04R 11/02; H04R 1/345; H04R 1/326; H04R 25/45; H04R 1/32; H04R 17/02; H04R 2201/109; H04R 7/18; H04R 25/502; H04R 1/2819; H04R 9/10; H04R 1/225; H04R 1/2865; H04R 2460/00; H04R 2499/10; H04W 4/80

See application file for complete search history.

(56) References Cited

FOREIGN PATENT DOCUMENTS

| | | |
|---|---|---|
| CN | 105827813 A | 8/2016 |
| CN | 106210960 A | 12/2016 |
| CN | 110891216 A | 3/2020 |
| EP | 1191770 A2 | 3/2002 |

OTHER PUBLICATIONS

Second Office Action for Chinese Application No. 202011183256.2, mailed Jan. 10, 2022.
International Search Report for PCT application No. PCT/CN2020/126069, dated Jan. 27, 2021.
Written Opinion of the International Searching Authority for PCT application No. PCT/CN2020/126069, dated Jan. 27, 2021.

* cited by examiner

500

600

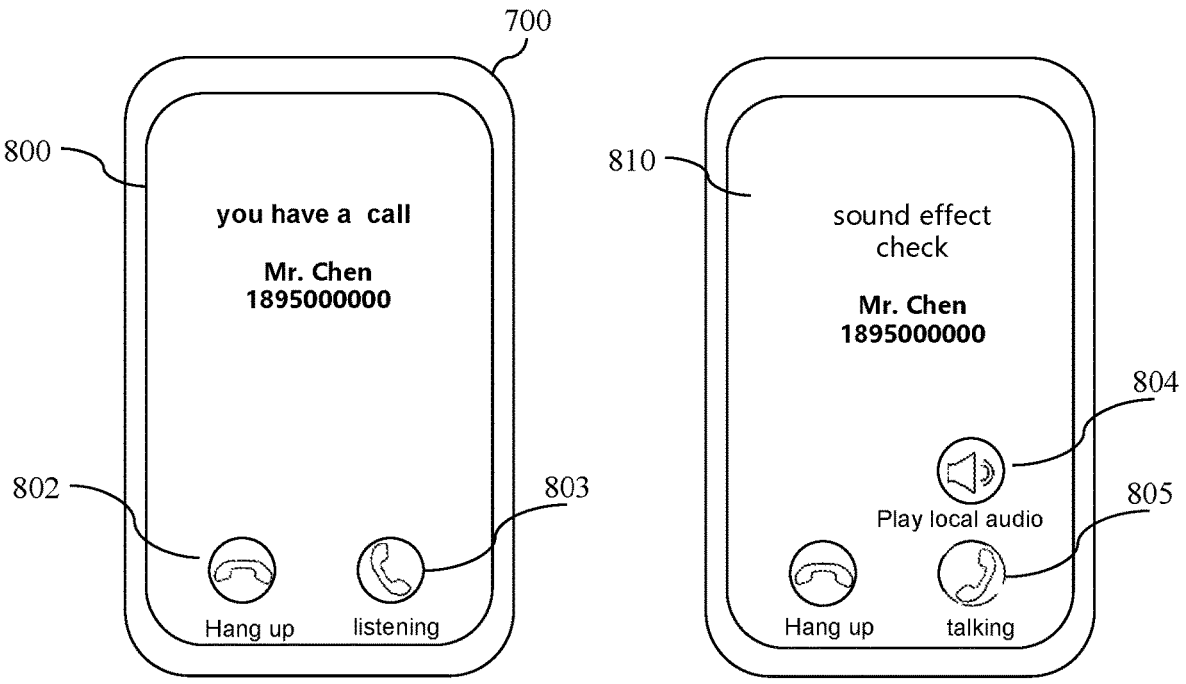
FIG. 8A
FIG. 8B
FIG. 8C

1010 you have a  call

Mr. Chen
1895000000

Hang up          listening

1020 you have a  call

Mr. Chen
1895000000

Hang up          Play local audio
                 and talking

1030

On the phone

Mr. Chen
1895000000

Hang up          Stop playing

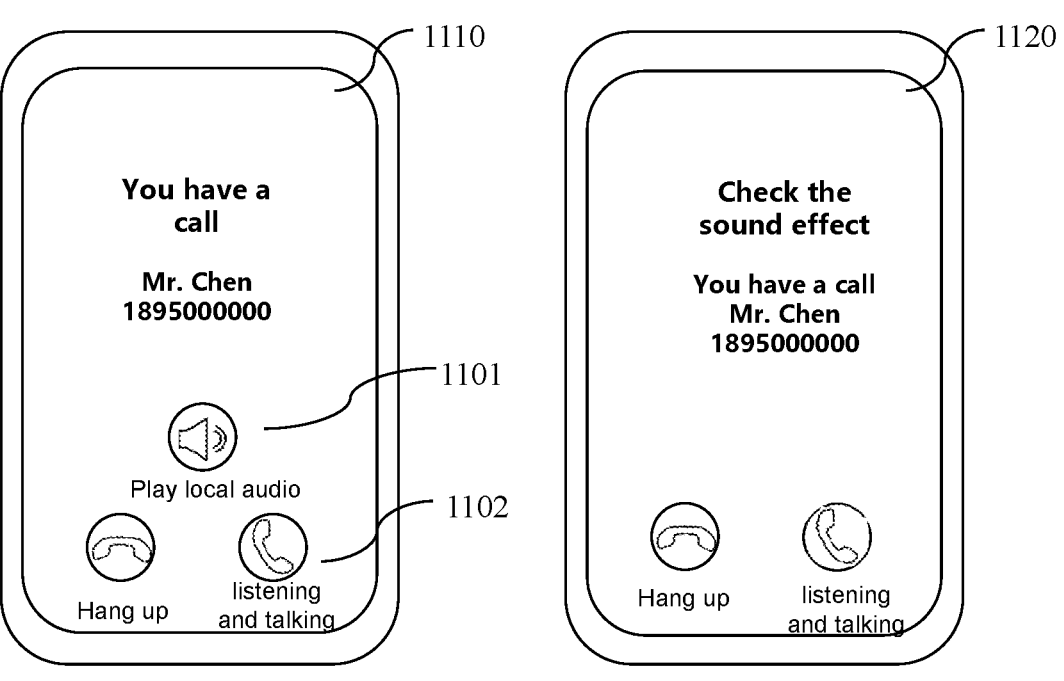
FIG. 11A
FIG. 11B
FIG. 11C

EARPHONE DEVICE AND COMMUNICATION METHOD

CROSS-REFERENCE TO RELATED APPLICATIONS

This application is a continuation of PCT/CN2020/126069, filed Nov. 3, 2020, which claims the priority of Chinese Patent Application No. 201911073317.7 filed Nov. 5, 2019 and Chinese Patent Application No. 202011183256.2, filed Oct. 29, 2020, the entire contents of which are Incorporated herein by reference.

BACKGROUND OF THE INVENTION

Field of the Invention

The present invention relates to the field of electronic communication devices, in particular to an earphone device, a communication device, a communication system and a communication method.

Description of the Related Art

With applications of mobile Internet terminals such as mobile devices and network audio and video software, it is more convenient for people to communicate anytime and anywhere. Earphones are widely used with these mobile devices. In most cases, people talk and listen to music through earphones. In view of complexity and diversity of call environment, people are often in a noisy environment when making a call. The surrounding or ambient noise in the call environment has an increasingly negative impact on the call quality. For users of portable multimedia digital devices who wear earphones to listen to music, watch movies or play video games, the negative impact of noise on the user experience could be sometimes unbearable. Ideally, the current earphone device needs to perform corresponding audio processing before transmitting the audio signal collected by a microphone to an opposite end of a call, so as to improve quality of the audio signal.

As shown in FIG. 12, an audio processing unit is provided in an earphone device of the related art, which comprises a first audio processing module for processing the audio signal to be transmitted and a second audio processing module for processing the audio signal to be played. The first audio processing module is used to perform all audio processing before transmission, and output the audio signal to be transmitted to a communication unit of the earphone device, and the communication unit transmits the audio signal to be transmitted to a call opposite end. The second audio processing module is used to perform all audio processing before playback, and output the audio signal to be played to a speaker of the earphone device, and the speaker plays the audio signal to be played.

During a phone call, the first audio processing module is used to perform analog-to-digital conversion, digital noise reduction and other audio processing on the audio signal including a local ambient sound and a caller voice signal collected by the microphone to obtain the audio signal to be transmitted, and then the communication unit transmits the audio signal to the call opposite end. For the audio signal from the call opposite end received through the communication unit, the second audio processing module is used to perform digital-to-analog conversion, power amplification and other processing to obtain the audio signal to be played and then play it through the speaker. It can be seen that the audio signal output by the first audio processing module is an audio signal that has completed all the audio processing before transmission. The communication unit and a related encoding unit only need to encode and transmit it according to a predetermined transmission protocol. The audio signal output by the second audio processing module is an audio signal that has completed all the audio processing before playback. The speaker just needs to receive and play the audio signal output by the second audio processing module. In addition, the earphone device also uses an active noise reduction processing module to achieve noise cancellation and the like. Noise reduction technology has developed rapidly over time. Especially after some emerging technologies are applied in the field of noise reduction, the noise reduction of earphones not only greatly improves performance, but also achieves various functions such as precise noise reduction and selective noise reduction. Users and their callers can enjoy a high-purity, high-intelligence audiovisual environment.

Users or callers are nevertheless caught in dilemma. It is difficult in some cases to hear their own voice after wearing earphones. In addition, due to the influence of various aspects such as the environment, wearing method, device performance, and audio processing technology design, the audio processing effect of many headphones is not satisfactory. Especially it is prone to instability in which the effect is good at some times and the effect is poor at other times. When a caller does not want a remote party (callee) to hear the sound of his/her environment, it is difficult to be sure that the callee would not hear it. For example, a product manual of an earphone indicates that it has noise reduction function, and even claims that it can completely eliminate the unwanted background sound due to the use of high intelligent noise reduction technology, people still cover the microphones with their hands or even leave their environment when answering the call because they have no confidence in their earphones.

Therefore, it is necessary to propose an improved technical scheme to solve the above problems.

SUMMARY OF THE INVENTION

One purpose of the present invention is to provide an earphone device, a communication device, a communication system and a communication method, which can enable a user to accurately grasp listening situation of an opposite end during a call.

To achieve the purpose, according one aspect of the present invention, an earphone device is provided. The earphone comprises: a microphone; a speaker; a communication unit; an audio processing unit comprising a first audio processing module for processing an audio signal to be transmitted and a second audio processing module for processing an audio signal to be played, the first audio processing module configured for receiving an audio signal collected by the microphone, and outputting a first audio signal to the communication unit and the second audio processing module, the second audio processing module configured for receiving the first audio signal, and outputting a second audio signal to the speaker; and a control unit configured for detecting whether a local audio is allowed to be played, and detecting whether talking is allowed after a call request from an external device is detected. When the local audio is allowed to be played and/or the talking is allowed, the microphone is controlled to collect a local audio signal comprising a local ambient sound, and the first audio processing module performs audio processing on the local audio signal to output the first audio signal. When the local audio is allowed to be played, the second audio processing module is controlled to perform audio processing on the first audio signal to output the second audio signal, and the speaker is controlled to play the second audio signal. When the talking is allowed, the communication unit is controlled to transmit the first audio signal to the external device.

One of the objectives, advantages and benefits in the present invention is to maximize consistency between the sound effect heard by the user from the local speaker and the sound effect heard by the opposite end of the call, so as to help the user check the sound effect finally sent to the opposite end of the call and confirm whether the current sound effect is the effect they want. Obviously, this can greatly enhance the user's confidence and improve the user's use experience.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

FIG. 8A to 8C are schematic diagrams showing a first type of call interfaces displayed by the communication device according to one embodiment of the present invention;

FIG. 11A to 11C are schematic diagrams showing a third type of call interface displayed by the communication device according to one embodiment of the present invention.

DETAILED DESCRIPTION OF THE PREFERRED EMBODIMENTS

Figure 1:
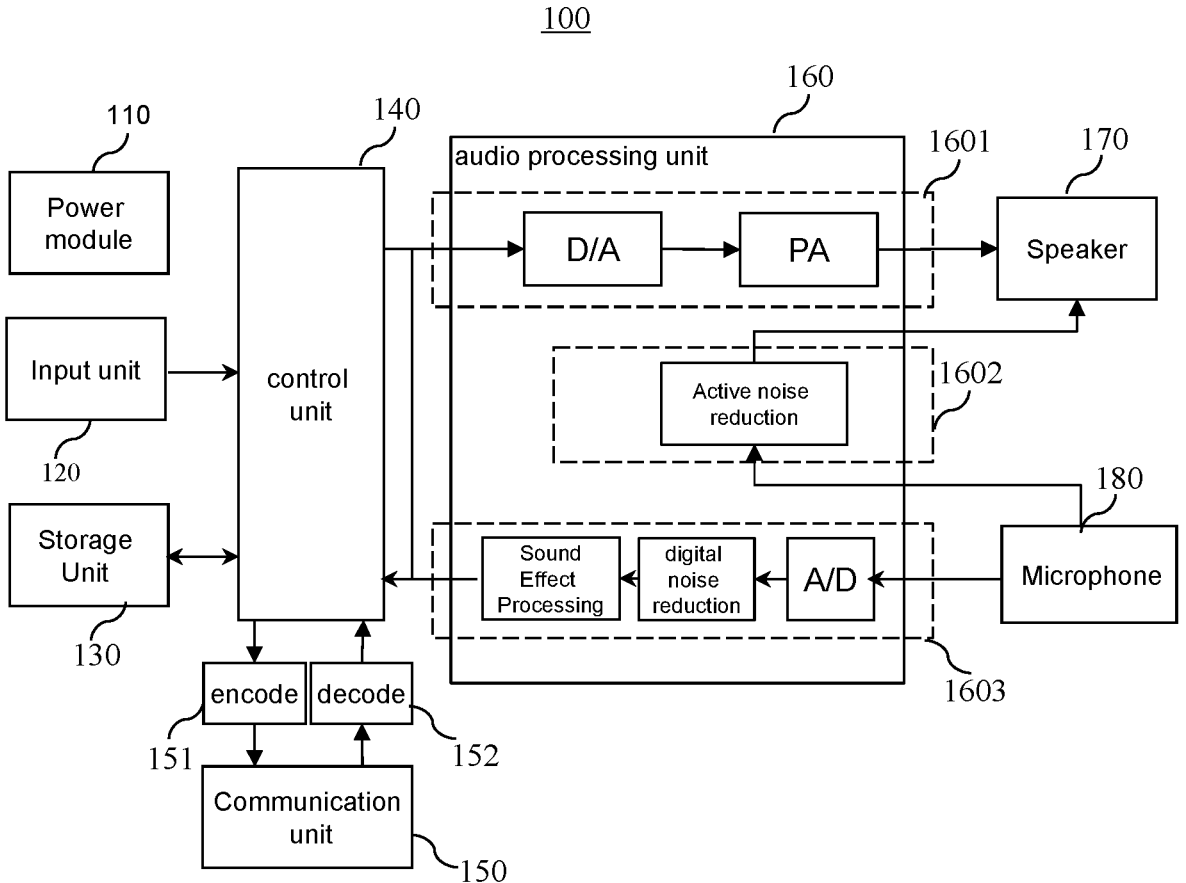
FIG. 1 is a schematic structural diagram of an earphone device according to one embodiment of the present invention.

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

One of the purposes of the present invention is to provide an earphone device, a communication device, a communication system and a communication method, so as to improve user's use experience and enhance user's confidence in use. According to one embodiment of the present invention, an earphone device is provided. The earphone device comprises a control unit, a microphone, an audio processing unit, a speaker, and a communication unit. The audio processing unit comprises a first audio processing module for processing audio signal to be transmitted and a second audio processing module for processing audio signal to be played. The first audio processing module is configured for receiving an audio signal collected by the microphone, and outputting a first audio signal to the communication unit. The second audio processing module is configured for receiving a first audio signal, and outputting a second audio signal to the speaker. The first audio processing module is configured to perform audio processing before transmission on the audio signal collected by the microphone. The second audio processing module is configured to perform audio processing before playback on the input audio signal.

The control unit is configured for detecting whether a local audio is allowed to be played, and detecting whether talking is allowed after a call request from an external device is detected. When the local audio is allowed to be played and/or the talking is allowed, the microphone is controlled to collect a local audio signal comprising a local ambient sound, and the first audio processing module performs audio processing before transmission on the local audio signal to output the first audio signal. When the local audio is allowed to be played, the second audio processing module is controlled to perform audio processing before playback on the first audio signal to output the second audio signal, and the speaker is controlled to play the second audio signal. When the talking is allowed, the communication unit is controlled to transmit the first audio signal to the external device.

In another embodiment, after the call request from the external device is detected, the control unit is configured for first detecting whether listening is allowed, and then detecting whether the local audio is allowed to be played and whether the talking is allowed, or the control unit is configured for first detecting whether the local audio is allowed to be played, and then detecting whether the listening and the talking are allowed.

In a further embodiment, the detecting whether the local audio is allowed to be played and whether the talking is allowed comprises: detecting whether the local audio is allowed to be played firstly; controlling the speaker to play the second audio signal when the local audio is allowed to be played until a time of playing the local audio reaches a predetermined time or an instruction to stop playing the local audio is received; and then detecting whether the talking is allowed when the local audio is not allowed to be played or playing of the local audio is stopped.

The earphone device can be one of various portable audio acquisition and output devices supporting voice calls, such as in ear earphones, headphones, wireless earphones, wired earphones, bone conduction earphones, smart glasses, and smart accessories, and etc. The external device may be an electronic communication device such as a mobile phone, a computer, a tablet computer, and a walkie-talkie, and etc. that establishes a wired or wireless signal transmission link with the earphone device during a call to forward the call request and audio information from the remote party of the call (call opposite end, i.e., device of the caller) to the earphone device. The external device may also be a remote device used by the remote party of the call, and may be electronic communication devices such as a mobile phone, a computer, a tablet computer, and a walkie-talkie.

In the earphone device, since the audio signal played by the speaker is obtained by processing the local audio signal collected by the microphone through the audio processing before transmission, the audio signal sent to the remote device during the call is also processed through the audio signal before transmission. The audio processing experienced by the two is exactly the same, so as to maximize the proximity of the sound effect heard by the user from the speaker and the sound effect heard by the remote party during the call. Therefore, no matter what specific audio processing ways are comprised in the audio processing before transmission, and no matter what audio processing effects are obtained, the users can check the final sound effect sent to the remote party through the speaker to confirm whether the current sound effect is the effect they want. This can greatly enhance the user's confidence in using the earphone and improve the user's use experience.

Further, the user can check the sound effect before the call. For example, when a call request is received and the earphone is still prompting an incoming call, the user can check the sound effect first, and then allow the listening and the talking. The process of checking the sound effect is done before the call is connected, so that the conversation with the remote party is not affected at all. In another example, after the call request is received, the user can first allow listening during the call to hear the remote party's voice. At this time, because the user has not allowed the talking, the remote party of the call cannot hear the voice of the user. The user can select to check the sound effect according to the situation, and then allow the talking during the call. At this time, since both the listening and the talking are allowed, the two parties of the call can have a normal conversation. In this way, the call is listened at the first time, and the process of checking the sound effect does not affect the remote party's conversation, and the remote party will not have obvious discomfort. It can be seen that the present invention is not only convenient for users to use, but also does not affect the call quality, and can complete the detection of sound effect when the remote party is basically insensitive.

Referring now to FIG. 1, it shows an exemplary earphone device 100 according to one embodiment of the present invention. The earphone device 100 comprises a power module 110, an input unit 120, a storage unit 130, a control unit 140, an encoding unit 151, a decoding unit 152, a communication unit 150, an audio processing unit 160, a speaker 170 and a microphone 180.

The power module 110 is configured to supply power to the earphone device 100. The input unit 120 is configured as a human-computer interaction command interface to receive various control instructions input by the user. The control instructions comprise instructions to allow listening, allow talking, allow or stop playing local audio, or comprise instructions to allow listening and talking, allow or stop playing local audio. The control instruments also comprise an earphone on-off instrument, a volume adjustment instrument, a mute instrument, a hang up instrument, etc. The input unit 120 can be various input modules such as touch panels, buttons, voice recognition, and etc. It can be understood that various control instructions may be independent instructions, or may be combined with other instructions. For example, the instruction to allow playing of local audio can be combined with the instruction to allow the talking into one command. For another example, the instruction to stop playing the local audio can be combined with the instruction to allow the talking into one instruction. In some specific implementations, other devices may also be used to communicate with the earphone device 100 to complete part or all of the functions of the input unit 120. For example, the smart phone communicates with the earphone device 100 to transmit the above-mentioned control instruments input by the user on the smart phone to the earphone device 100.

The storage unit 130 is used to store various data necessary for the operation of the earphone device, such as software program data. In a preferred embodiment, the storage unit 130 can also be used to store a preset fifth audio signal. When the earphone device plays the second audio signal for the user to check the sound effect, the earphone device can send the preset fifth audio signal to the remote party of the call. For example, a predetermined voice is such as "Hello, please hold, the number you dialed is busy now", "hello, hello", "Hello, I'm Sam", a predetermined beep, or a noise, and etc.

The control unit 140 is a control center of the earphone device, which uses various interfaces and lines to couple other modules in the earphone device, and performs overall monitoring and scheduling on each module of the earphone device to realize various functions.

The communication unit 150 is configured to perform data interaction with the external device according to a predetermined communication protocol. The predetermined communication protocol may be a wired communication protocol or a wireless communication protocol. The predetermined communication protocol can be standard wired/wireless protocols commonly used in the industry, or proprietary protocols. In some embodiments, the communication unit is an RF (radio frequency) circuit module, which may be implemented as a wireless communication circuit for communicating with other communication devices over a wireless communication network, including but not limited to antenna systems, RF transceivers, one or more amplifiers, tuners, oscillators, digital signal processors, memories, etc. The wireless communication network may be Global System for Mobile Communications (GSM), Long Term Evolution (LTE), Wideband Code Division Multiple Access (W-CDMA), Code Division Multiple Access (CDMA), Bluetooth, Bluetooth Low Energy (BLE), Wireless Fidelity (WIFI) and etc. As a preferred embodiment, the earphone device is a Bluetooth earphone, which establishes a wireless communication link with the external device based on a Bluetooth technical specification. As another preferred embodiment, the earphone device is a wired earphone, and the communication unit of the earphone device can be connected with a lightning interface, a type-C interface or other interfaces suitable for transmitting audio data of the external device through cables to realize wired communication.

The encoding unit 151 is configured to encode the data that the earphone device needs to output to the external device and then output it to the communication unit for transmission. The decoding unit 152 is configured to decode the data received by the communication unit 150 from the external device. In some embodiments, the encoding unit 151 and the decoding unit 152 may be disposed within the communication unit 150.

The microphone 180 is one microphone, a plurality of microphones, or a microphone array. As a preferred embodiment, the microphone 180 comprises a main microphone arranged close to user's lips and a noise reduction microphone disposed away from the user's lips.

The audio processing unit 160 is used for processing audio data, and comprises a first audio processing module 1603 for processing the audio signal to be transmitted, a second audio processing module 1601 for processing the audio signal to be played and an active noise reduction module 1602. The first audio processing module 1603 receives an audio signal collected by the microphone 180, and outputs a first audio signal to the communication unit 150 and the second audio processing module 1601 respectively. The second audio processing module 1601 is configured to receive the first audio signal, process the first audio signal to obtain a second audio signal, output the second audio signal to the speaker 170 for playback. The second audio processing module 1601 is further configured to receive a third audio signal output by the external device received by the communication unit 150, process the third audio signal to obtain a fourth audio signal, output the fourth audio signal to the speaker 170 for playback.

The first audio processing module 1603 is used to perform one or more audio processing such as analog-to-digital conversion A/D, digital noise reduction, dual-microphone noise reduction, and sound effect processing on the input audio signal to improve the sound effect of the input audio signal. Therefore, those skilled in the art can use various appropriate audio processing ways to realize the first audio processing module 1603 according to actual needs, which is not limited to those listed in this paper. The analog-to-digital conversion is used to convert the analog audio signal collected by the microphone into a digital audio signal. The digital noise reduction is used to remove digital acoustic noise in the digital domain, so as to remove steady-state noise, white noise, and the like. Dual-microphone noise reduction is used to perform noise reduction processing on the audio signal collected by the main microphone based on the audio signal collected by the noise reduction microphone, so as to eliminate the environmental noise in the audio signal collected by the main microphone, so that the audio signal collected by the main microphone can be more clearly transmitted to the remote party of the call. The dual-microphone noise reduction can be done before or after the analog-to-digital conversion. The sound effect processing comprises one or more of pitch shifting processing, sound mixing processing, or other sound effect processing. The pitch-shift processing is to perform pitch-shift processing on the voice signal in the audio signal collected by the microphone to obtain voice-changing effects such as female voice to male voice, male voice to female voice, baby voice, electronic voice, and etc. Specifically, the Chinese patent with an application number of 201010164983.4 proposes a method and device for voice pitch shifting. The sound mixing processing can be used to add background sounds, such as noise, music, train whistle, ringtones, etc., to the audio signals collected by the microphone 180, so as to protect the user's privacy. Specifically, the Chinese patent application with the application number CN201110422527.X provides a method for adding background sound and a Bluetooth earphone, which is incorporated herein by reference.

The second audio processing module 1601 is used to perform one or more audio processing such as digital-to-analog conversion, power amplification (PA), volume adjustment, etc. on the input audio signal, so as to obtain an audio signal suitable for speaker. Therefore, those skilled in the art can implement the second audio processing module 1601 by using various appropriate audio processing ways according to actual needs, which are not limited to those listed in this paper. For example, in the two channel earphone or stereo earphone, the audio processing of dividing the received audio signal into different channels can also be added, so that the audio signal in the different channels can be played in different channels.

The active noise reduction module 1602 is used to analyze the noise audio signal collected by the noise reduction microphone, generate a noise reduction signal with an opposite phase to the noise audio signal, and play the noise reduction signal through the speaker 170.

The speaker 170 may be a mono speaker or a multi-channel speaker. As a preferred embodiment, the speaker 170 comprises a left channel speaker and a right channel speaker. Therefore, when only the fourth audio signal is played, the same fourth audio signal can be played simultaneously in the left channel speaker and the right channel speaker. Alternatively, the left channel audio of the fourth audio signal can be played through the left channel speaker, and the right channel audio of the fourth audio signal can be played through the right channel speaker, so as to realize the stereo playback function. When the second audio signal and the fourth audio signal need to be played at the same time, one of the left channel speaker and the right channel speaker may be used to play the second audio signal, and the other one may be used to play the fourth audio signal.

During the call, the control unit 140 is used to detect whether the local audio is allowed to be played, and detect whether the talking is allowed after a call request from the external device is received. When the local audio is allowed to be played and/or the talking is allowed, the microphone 180 is controlled to collect the local audio signal including the local ambient sound, and the first audio processing module 1603 performs audio processing on the local audio signal to obtain and output the first audio signal. When the local audio is allowed to be played, the second audio processing module 1601 is controlled to perform audio processing on the first audio signal to obtain and output a second audio signal, and the speaker 170 is controlled to play the second audio signal. When the talking is allowed, the communication unit 150 is controlled to transmit the first audio signal to the external device.

In addition, the control unit 140 is further configured to detect whether listening is allowed. When the listening is allowed, the communication unit 150 is controlled to receive the third audio signal from the external device, and output the third audio signal to the second audio processing module 1601, the second audio processing module 1601 performs audio processing on the third audio signal to obtain a fourth audio signal, and the speaker 170 is controlled to play the fourth audio signal.

The control unit 140 is also used to detect whether the listening and talking are allowed simultaneously. When the listening and the talking are allowed simultaneously, the communication unit 150 is controlled to receive the third audio signal from the external device, and output the third audio signal to the second audio processing module 1601, the second audio processing module 1601 performs audio processing on the third audio signal to obtain the fourth audio signal, and the speaker 170 is controlled to play the fourth audio signal. At the same time, the communication unit 150 is also controlled to send the first audio signal to the external device.

In a specific embodiment, the first audio signal is encoded by the encoding unit 151 and then sent to the external device through the communication unit 150. The data stream from the external device received by the communication unit 150 is decoded by the decoding unit 152 to obtain the third audio signal.

According to one embodiment of the present invention, a communication method is also provided. The communication method comprises: collecting a local audio signal comprising a local ambient sound, and performing audio processing before transmission on the local audio signal to obtain a first audio signal when a local audio is allowed to be played and/or talking is allowed; performing audio processing before playback on the first audio signal to obtain a second audio signal, and playing the second audio signal when the local audio is allowed to be played; transmitting the first audio signal to an external device when the talking is allowed.

The operation of the audio processing before transmission is used to perform audio processing on the audio signal to be transmitted, which may comprise all audio processing on the local audio signal from its acquisition to its transmission to the remote party of the call, so that the first audio signal containing the sound effect finally transmitted to the remote party can be obtained.

The operation of the audio processing before playback is used to perform audio processing on the audio signal to be played, which may comprise all audio processing on the received audio signal before playing, so that the second audio signal that can be directly used for playing can be obtained.

Figure 2:
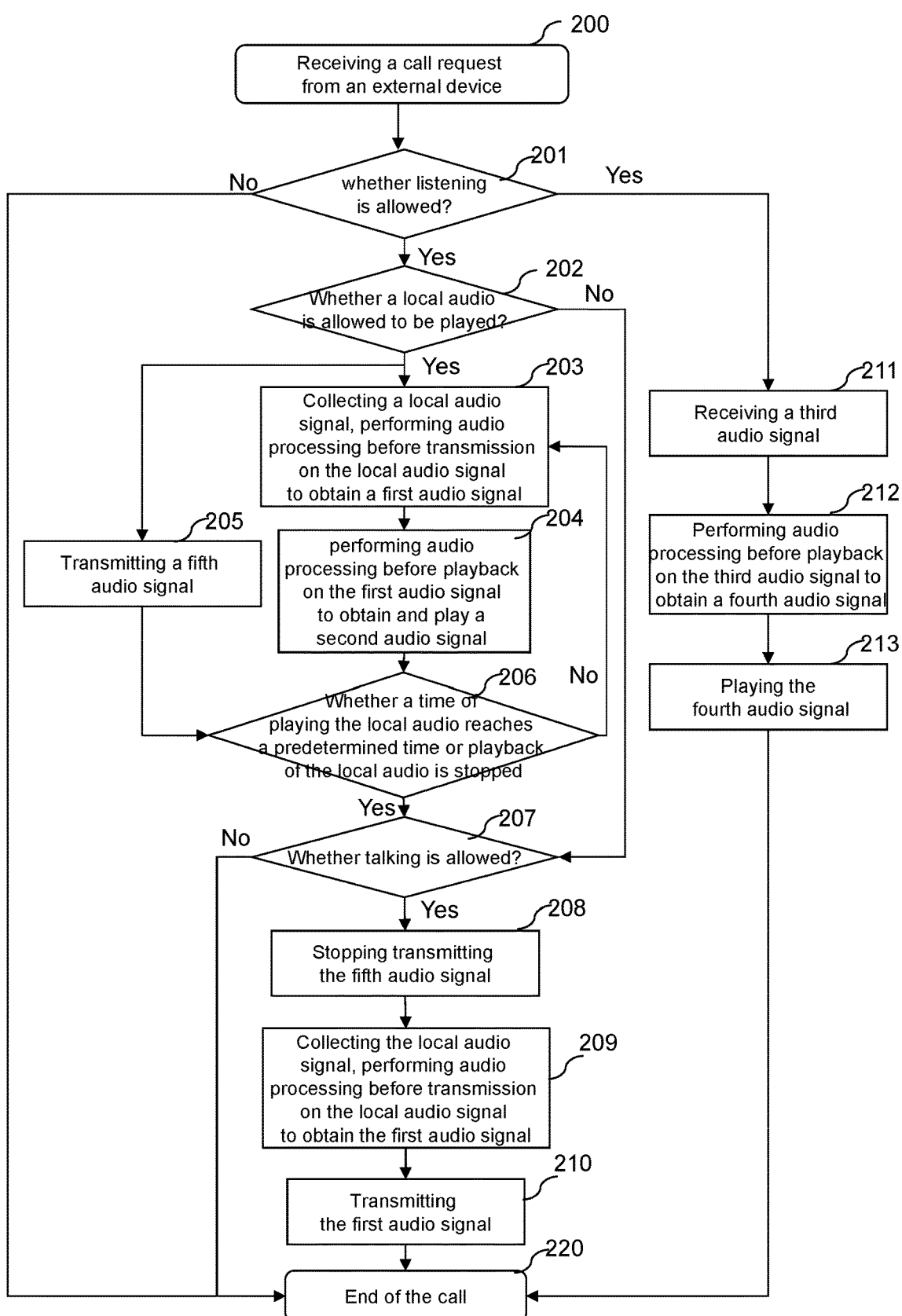
FIG. 2 is a schematic flowchart showing a communication method according to another embodiment of the present invention.

FIG. 2 shows a communication method according to another embodiment of the present invention. This method can be used for the earphone device in the embodiment of FIG. 1. The communication method comprises following operations. When a call request from an external device is received at 200, the method enters 201. At 201, whether listening is allowed is detected. The instruction to allow or reject the listening may be given by the user operating the input unit on the earphone device, or operating a mobile communication device such as a mobile phone connected to the earphone device.

When the listening is allowed, the method goes to 202 and 211 at the same time, otherwise the method continues to wait for the instruction to allow the listening. As a preferred embodiment, if the instruction to allow the listening has not been received, the call can be hung up after a predetermined period of time has passed. After the instruction to reject the listening is received, the method goes to 220, where the call can be hung up. At 202, whether a local audio is allowed to be played is detected. When the local audio is allowed to be played, the method goes to 203, otherwise, the method jumps to 207. As a preferred embodiment, when the local audio is allowed to be played, the operations 203 and 205 may be performed simultaneously.

At 203, a local audio signal including a local environmental sound is collected, and the audio processing before transmission is performed on the local audio signal to obtain a first audio signal. The operation of the audio processing before transmission is used to perform one or more audio processing such as analog-to-digital conversion A/D, digital noise reduction, dual-microphone noise reduction, and sound effect processing on the input audio signal, so as to improve sound effect of the input audio signal.

At 204, the audio processing before playback is performed on the first audio signal to obtain a second audio signal, and the second audio signal is played. The operation of the audio processing before playback is used to perform one or more audio processing such as digital-to-analog conversion, power amplification, volume adjustment, etc. on the input audio signal, so as to obtain the audio signal suitable for the speaker.

At 205, a preset fifth audio signal is transmitted to the external device. As an optional solution, in order to minimize discomfort of the caller because the user does not participate in the call in time, when the user chooses to play the local audio, the preset fifth audio signal are sent to the caller. For example, the preset artificial voice "Hello, please hold on, the number you dialed is busy now" is used as the preset fifth audio signal, thereby ensuring the comfort of the caller during the call, thus further increasing the user's good experience.

At 206, whether a time of playing the local audio reaches a predetermined time, or the instruction to stop playing the local audio is received. When it is detected that the time of playing the local audio has reached the predetermined time, or the instruction to stop playing the local audio is received from the user, the method goes to 207 to stop playing the local audio. Otherwise, the method returns to 203, and continues to collect the local audio signal, and play the second audio signal.

The predetermined time can be set to a short time such as 3 s, 5 s, and etc. Even if the user has enough time to listen to the local audio signal, don't make the remote party of the call wait too long.

At 207, whether the talking is allowed is detected. When the instruction input by the user to allow the talking is detected, the method goes to 208. When the user chooses not to allow the talking, the method goes to 220. As an alternative solution, the operation 207 can be omitted. That is, when it is detected that the time of playing the local audio has reached the predetermined time, or the instruction to stop playing the local audio is received, the method defaults to allow the talking and enters 208 directly.

At 208, transmitting the fifth audio signal is stopped. At 209, the local audio signal including the local environmental sound is collected, and the audio processing before transmission is performed on the local audio signal to obtain the first audio signal. At 210, the first audio signal is transmitted to the external device. In this way, the user completes the trial listening to the sound effect of the local audio before the normal call, and then enters the normal call state with the remote party of the call.

At 211, a third audio signal is received from the external device. The third audio signal may be an audio signal such as a voice sent by the remote party of the call. At 212, the audio processing before playback is performed on the third audio signal to obtain a fourth audio signal. At 213, the fourth audio signal is played.

In one embodiment, since two audio signals are played at 204 and 213 respectively, the audio processing before playback may further comprise synthesis processing. That is, the second audio signal to be played and the fourth audio signal to be played are synthesized into one synthetic audio signal, and then the synthetic audio signal is played through the speaker.

When synthesizing, the volume of one audio signal can be controlled to be smaller than the other audio signal, so as to highlight the audio signal that the user currently wants to listen to. For example, the volume of the second audio signal can be made larger than the fourth audio signal, so that the user can listen to the local audio signal collected by the microphone and processed by the audio processing before transmission. After stopping playing of the second audio signal in 206, the volume of playing the fourth audio signal is resumed. In another preferred embodiment, the speakers comprise a left channel speaker and a right channel speaker. One audio signal is played through one of the left channel speaker and the right channel speaker, and another audio signal is played through the other of the left channel speaker and the right channel speaker. In this way, the user can hear sounds from different sources from different channel speakers, and can clearly listen to the voice of the caller without affecting the listening of the local audio signal collected by the microphone. After stopping the playing of the second audio signal, the left channel speaker and the right channel speaker are resumed to play the fourth audio signal.

At 220, the call ends. Based on the communication method of the present invention, after the call request is received, the user can first allow the listening. At this time, while the users listen to the voice of the caller (the remote party of the call), the users can select to allow the local audio to be played, and then say something by himself to listen to the sound effect. For example, the ambient sound has been filtered out, the background sound has been added, the tone of voice has been changed, the male voice has been changed to the female voice, and so on. After confirming that the sound effect is the effect that the user wants, the user can make a normal call with the remote party of the call.

The remote party of the call starts talking after hearing the call being answered. Since the user does not allow the talking at this time, the remote party of the call cannot hear the real voice made by the user. If the user presets the fifth audio signal, the remote party of the call can hear the fifth audio signal at this time. If it is not preset, the remote party of the call cannot hear any sound from the user at this time. After the user allows the talking, the remote party of the call can hear the first audio signal from the local party of the call, that is, the audio signal sent by the user and processed by the audio process before transmission. If the user finally chooses not to allow the talking and hangs up, the remote party will usually think that it is a communication failure because the call is answered, and will not misunderstand and complain because the call is hung up.

On the one hand, the function of pre-confirming the sound effect of the call is added during the call, avoiding the worry of privacy leakage, or the embarrassment of changing the call environment, improving the privacy protection capability and increasing the user's confidence in use. On the other hand, the traditional method of allowing the invited party of the call to listen and talk with one key at the same time has been changed, so that the user has time for confirmation and decision-making before deciding to have a normal call with the remote party of the call, which improves the comfort during the call and helps users maintain good interpersonal communication.

Figure 3:
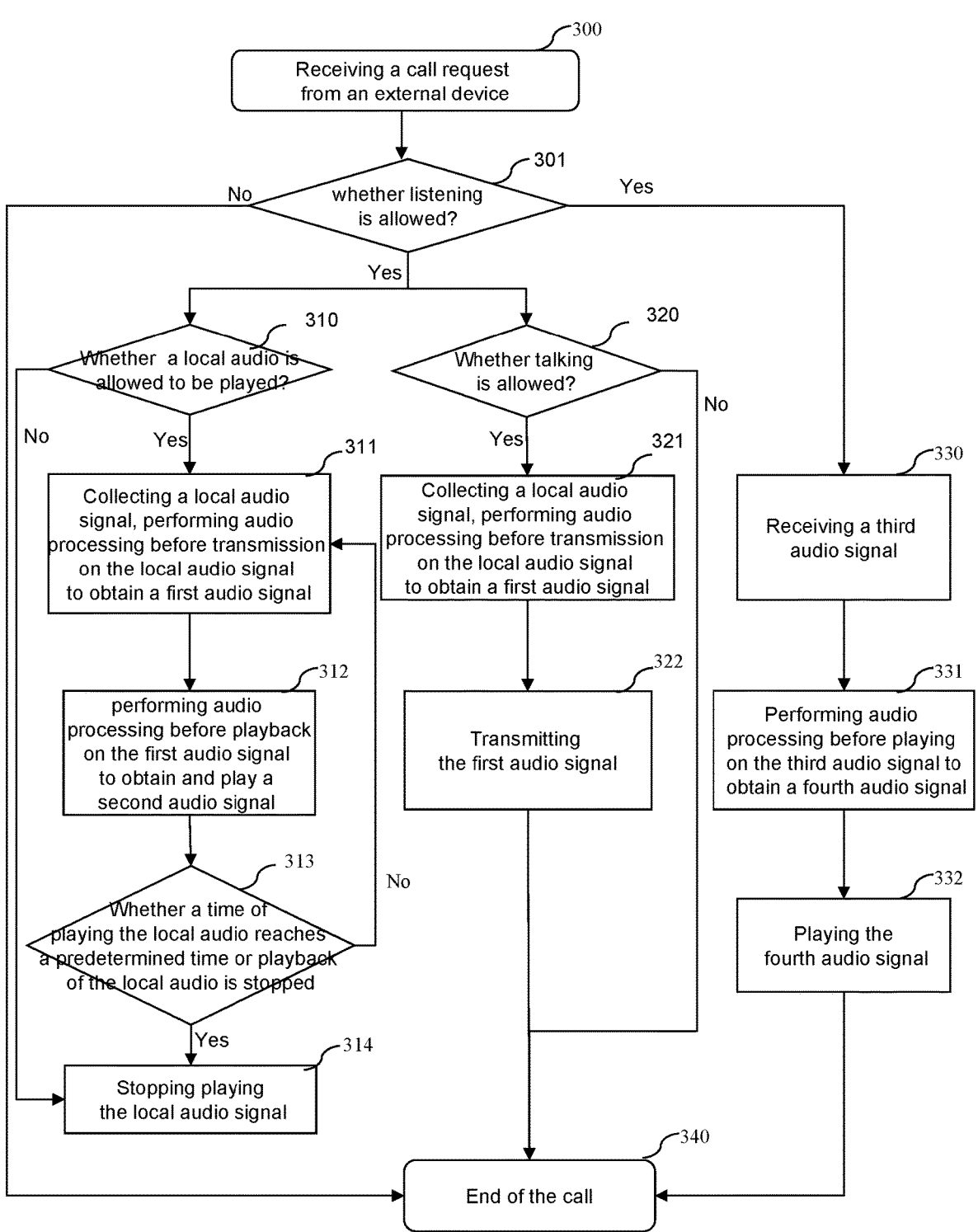
FIG. 3 is a schematic flowchart showing a communication method according to still another embodiment of the present invention.

FIG. 3 shows a communication method according to one embodiment of the present invention. This method can be used for the earphone device in the embodiment of FIG. 1. The communication method comprises following operations. When a call request from an external device is received at 300, the method enters 301. At 301, whether listening is allowed is detected. When the listening is allowed, the method goes to 310, 320 and 330 at the same time. Otherwise, the method continues to wait for the instruction to allow the listening. As a preferred embodiment, if the instruction to allow listening has not been received, the call can be hung up after a predetermined period of time has passed.

After the instruction to reject the listening is received, the method goes to 340, where the call can be hung up. At 310, whether a local audio is allowed to be played is detected. When the local audio is allowed to be played, the method goes to 311, otherwise, the method jumps to 314. At 311, a local audio signal including a local environmental sound is collected, and the audio processing before transmission is performed on the local audio signal to obtain a first audio signal.

The operation of the audio processing before transmission is used to perform one or more audio processing such as analog-to-digital conversion A/D, digital noise reduction, dual-microphone noise reduction, and sound effect processing on the input audio signal, so as to improve the sound effect of the input audio signal.

At 312, the audio processing before playback is performed on the first audio signal to obtain a second audio signal, and the second audio signal is played. The operation of the audio processing before playback is used to perform one or more audio processing such as digital-to-analog conversion, power amplification, volume adjustment, etc. on the input audio signal, so as to obtain the audio signal suitable for the speaker.

At 313, whether a time of playing the local audio reaches a predetermined time, or the instruction to stop playing the local audio is received. When it is detected that the time of playing the local audio has reached the predetermined time, or the instruction to stop playing the local audio is received from the user, the method goes to 314, where playing of the local audio is stopped. Otherwise, the method returns to 311, and continues to collect the local audio signal, and play the second audio signal.

At 314, playing of the local audio is stopped. At 320, whether the talking is allowed is detected. When the instruction input by the user to allow the talking is detected, the method goes to 321. When the user chooses not to allow the talking, the method goes to 340. In a preferred embodiment, when the instruction of whether to allow the talking input by the user is not detected, a predetermined period of time can be waited so that the user has enough time to choose whether to allow the talking or not. As a further preferred embodiment, within the predetermined period of time, a preset fifth audio signal may be sent to the external device with reference to the embodiment of FIG. 2, until the instruction of whether to allow the talking input by the user is detected.

It should be understood that, for the convenience of description, the operations 310 and 320 are divided into two detection operations, but in actual implementation, the operations 310 and 320 can be substantially one detection operation. That is, the operation of whether the local audio is allowed is the same one with the operation of whether talking is allowed. The user can choose to allow the local audio to be played and the talking at the same time by inputting one instruction.

At 321, the local audio signal including the local environmental sound is collected, and the audio processing before transmission is performed on the local audio signal to obtain the first audio signal. It should be understood that when the local audio is allowed to be played and the talking is allowed at the same time, the operation 321 and the operation 311 may be the same operation. That is, the first audio signal obtained in this operation can be used in 312 and 322 at the same time.

At 322, the first audio signal is transmitted to the external device. At 330, a third audio signal from the external device is received. At 331, the audio processing before playback is performed on the third audio signal to obtain a fourth audio signal. At 332, the fourth audio signal is played. At 340, the call ends. Based on the communication method of this embodiment, after the call request is received, the user can first allow the listening, and then allow the talking and the local audio to be played at the same time. At this time, the user can hear the voice sent to the remote party from the speaker while talking normally with the remote party of the call. At this point, the user can not only confirm the sound effects during the call, but also adjust their own local sound effects at any time during the call, or start the voice change processing at any time, and add background sounds, etc., to share happy moments with the remote party. For example, when it is found that the noise is too large, the user can adjust the way of wearing the earphone or change the environment to avoid the failure of the dual-microphone noise reduction function.

It can be seen that the communication method provided in this embodiment can not only discover defects in the call at any time, but also add a lot of fun to the call. As another variation of the embodiment of FIG. 3, the operations 301, 310 and 320 can also be combined into one operation. That is, it is detected whether the listening, the local audio and the talking are allowed simultaneously. If yes, it is considered that the local audio is also allowed to be played, and then the operations 311, 321 and 330 are performed simultaneously. The operations 311 and 321 may be combined into one operation. In this way, it is similar to answer a call with one key in the related art, and the function of playing the local audio is also enabled at the same time. It is more convenient for users to use without worrying about privacy.

Figure 4:
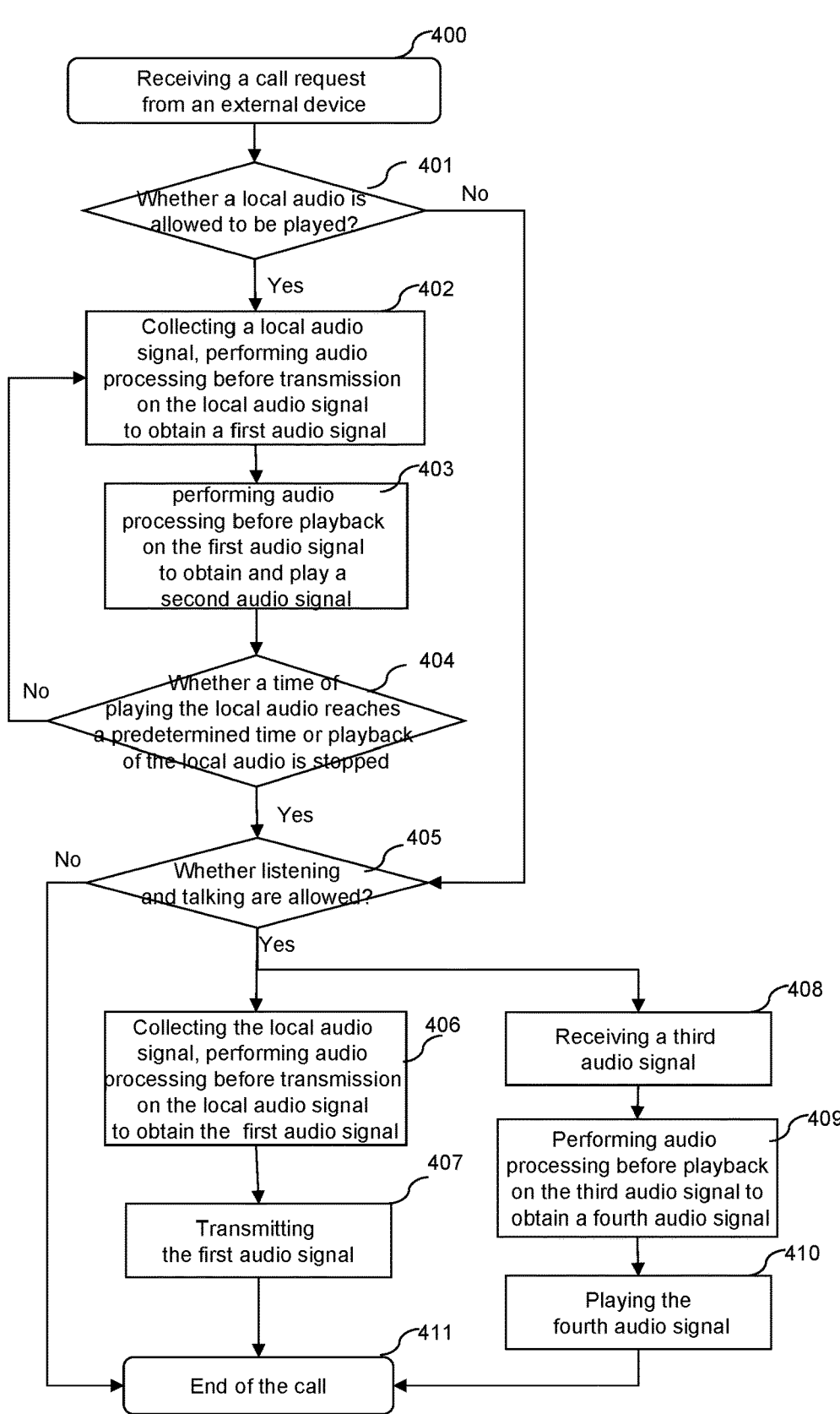
FIG. 4 is a schematic flowchart showing a communication method according to still another embodiment of the present invention.

FIG. 4 shows a communication method according to still another embodiment of the present invention. This method can be used for the earphone device in the embodiment of FIG. 1. The communication method comprises following operations.

When a call request from an external device is received at 400, the method enters 401. At 401, whether the local audio is allowed to be played is detected. When the local audio is allowed to be played, the method goes to 402. Otherwise, the method jumps to 405. At 402, a local audio signal including a local environmental sound is collected, and the audio processing before transmission is performed on the local audio signal to obtain a first audio signal. At 403, the audio processing before playback is performed on the first audio signal to obtain a second audio signal, and the second audio signal is played. At 404, whether a time of playing the local audio reaches a predetermined time, or the instruction to stop playing the local audio is received.

When it is detected that the time of playing the local audio has reached the predetermined time, or the instruction to stop playing the local audio is received from the user, the method goes to 405 to stop playing the local audio. Otherwise, the method returns to 401, continues to collect the local audio signal, and plays the second audio signal.

At 405, whether the listening and the talking are allowed. When the listening and the talking are allowed, the method goes to 406 and 408. Otherwise, the method jumps to 411, where the call ends. At 406, the local audio signal including the local environmental sound is collected, and the audio processing before transmission is performed on the local audio signal to obtain the first audio signal. At 407, the first audio signal is transmitted to the external device. At 408, the third audio signal from the external device is received.

The third audio signal may be the audio signal such as a voice sent by the remote party of the call. At 409, the audio processing before playback is performed on the third audio signal to obtain a fourth audio signal. At 410, the fourth audio signal is played. At 411, the call ends. Based on the communication method provided in the embodiment of FIG. 4, after the call request is received, the user may first allow the local audio to be played to detect the sound effect of the call. After the sound effect is confirmed to be satisfactory, the normal call can be allowed. Different from the embodiment in FIG. 2 or FIG. 3, the operation 405 in the embodiment of FIG. 4 is similar to the function of answering a call with one key in the related art, and simultaneously starts the listening and the talking functions. Compared with the embodiments in FIG. 2 and FIG. 3, the process of confirming the sound effect by the user is set in a ringing stage of the call, which not only leaves the user enough time to check and adjust the sound effect, but also does not have any impact on the remote party of the call. In this way, the operation is simple, the use is convenient, and the privacy protection performance is good.

Figure 5:
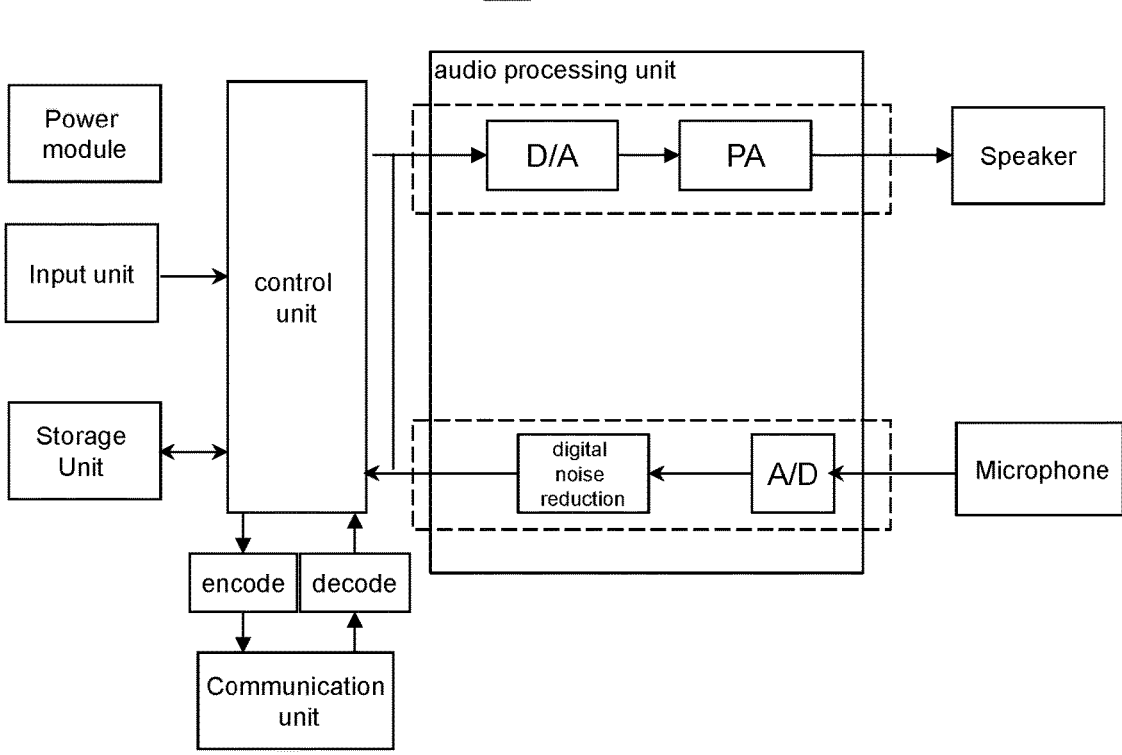
FIG. 5 is a schematic structural diagram of an earphone device according to still another embodiment of the present invention.

FIG. 5 shows an earphone device 500 according to one embodiment of the present invention. The difference between the earphone device 500 and the earphone device 100 in the embodiment of FIG. 1 is that the audio processing unit of the earphone device 500 only comprises the first audio processing module and the second audio processing module, and the first audio processing module only performs analog-to-digital conversion and digital noise reduction processing on the input audio signal. Therefore, compared with the earphone device 100, the audio processing process in the earphone device 500 is relatively simple. However, it is obvious that the earphone device 500 of the present embodiment can still be used to realize the communication methods in the embodiments of FIGS. 2-4.

By adopting the earphone device and the communication method in the above-mentioned embodiments of the present invention, the audio signal closest to the sound effect listened by the remote party of the call can be played in the earphone device, so that the user can timely and accurately confirm or adjust the call, which not only protects the user's privacy, but also makes the use of the earphone more convenient and comfortable.

Figure 6:
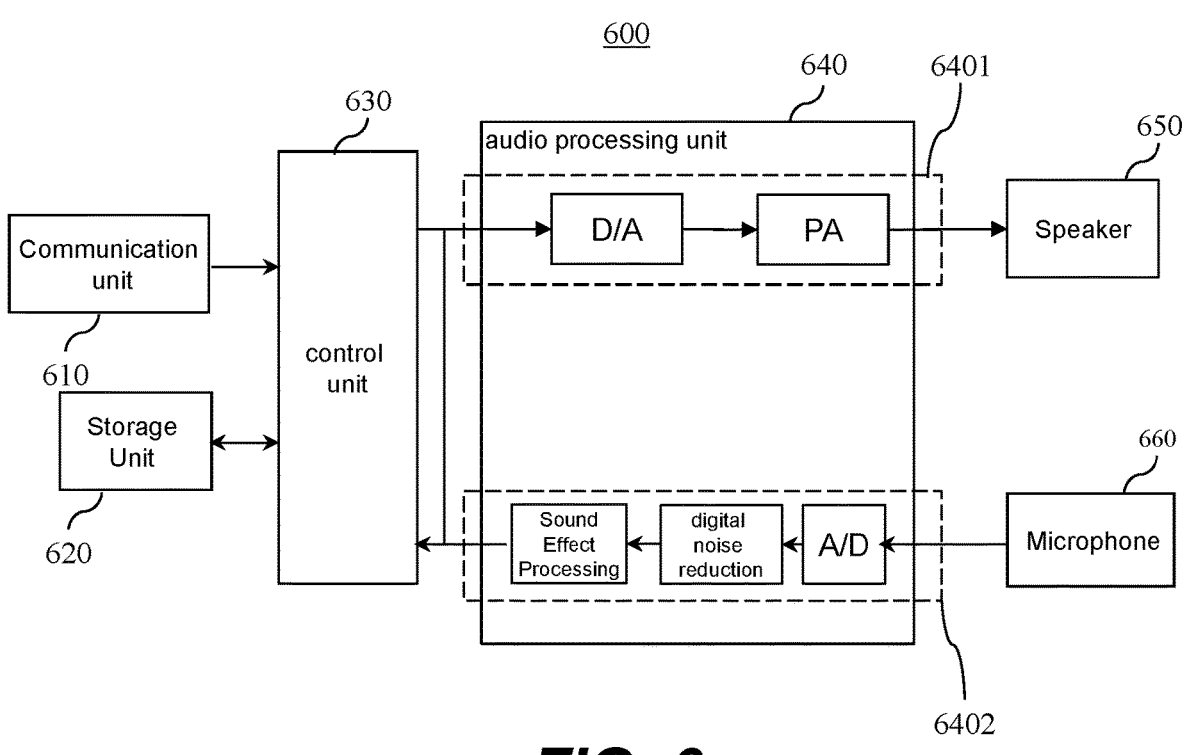
FIG. 6 is a schematic structural diagram of a communication device according to still another embodiment of the present invention.

FIG. 6 shows a communication device 600 according to still another embodiment of the present invention. As shown in FIG. 6, the communication device 600 comprises a control unit 630, an audio processing unit 640 and a communication unit 610. The control unit 630 is a control center of the above-mentioned units of the communication device 600, which uses various interfaces and lines to couple other units in the communication device 600, and performs overall monitoring and scheduling for each unit to realize various functions of the communication device 600.

The audio processing unit 640 comprises a first audio processing module 6402 for processing the audio signal to be transmitted, and a second audio processing module 6401 for processing the audio signal to be played. The first audio processing module 6402 is configured to receive the audio signal to be transmitted to the remote party of the call, perform audio processing before transmission on the audio signal to be transmitted, and output a first audio signal that has completed the audio processing before transmission to the communication unit 150 and the second audio process-ing module 1601 respectively. The second audio processing module 1601 is configured to perform audio processing before playback on the audio signal to be played locally, receive the first audio signal, process the first audio signal to obtain a second audio signal, output the second audio signal to the speaker for playback.

The communication unit 610 is configured to receive a third audio signal from the remote party of the call, and output the third audio signal to the second audio processing module 6401. The second audio processing module 6401 performs audio processing on the third audio signal to obtain a fourth audio signal for the speaker. The communication unit can also be used to send the first audio signal output by the first audio processing module 6402 to the external device. In some embodiments, the communication unit 610 may be implemented as a wireless communication module that communicates with the external device based on a predetermined wireless communication protocol with refer-ence to the foregoing embodiments. In other embodiments, the communication unit 610 can be implemented as a communication bus, signal line, or communication circuit, etc., so that the communication device can be coupled and communicated with other components in an electronic sys-tem.

In some embodiments, the first audio processing module 6402 has an interface for connecting an external micro-phone, so as to receive the local audio signal collected by the external microphone. The second audio processing module 6401 has an interface for connecting an external speaker, so as to output the second audio signal and/or the fourth audio signal to the external speaker.

In some embodiments, the interfaces for connecting the external microphone and connecting the external speaker may be implemented as a connection terminal for connect-ing to a system bus, a signal line, which is coupled with the microphone and the speaker through the system bus, signal line, and etc. The interfaces for connecting the external microphone and connecting the external speaker may also be implemented as a headset jack that provides an interface between the audio processing unit and a removable audio input/output peripheral. The removable audio input/output peripheral may be, for example, a headset with audio output and input functionality, and/or a headset with audio output only, and/or a microphone with audio input only.

In some embodiments, the communication device may further comprise a microphone 660 and a speaker 650. The second audio processing module 6401 converts the digital audio data of the first audio signal and/or the third audio signal into an analog electrical signal including the second audio signal and/or the fourth audio signal, and transmits the analog electrical signal to the speaker 650, which converts the analog electrical signal into a sound-waves audible to humans. The first audio processing module 6402 receives the analog electrical signal converted by the microphone 660 according to the sound wave, performs the audio processing before transmission on the electrical signal, converts the analog electrical signal into digital audio data and outputs it as the first audio signal.

When the local audio is allowed to be played and/or the talking is allowed, the control unit 630 is configured to control the first audio processing module to receive the local audio signal including the local ambient sound, perform the audio processing before transmission on the local audio signal to obtain and output the first audio signal. When the local audio is allowed to be played, the control unit 630 controls the second audio processing module to perform audio processing before playback on the first audio signal to output the second audio signal that can be played by the speaker or the removable audio output peripheral device. When the talking is allowed, the control unit 630 controls the communication unit to transmit the first audio signal.

In some embodiments, the communication device 600 may further comprise a storage unit 620. The storage unit 620 is configured for storing various data necessary for operation of the communication device, such as software program data. In a preferred embodiment, the storage unit 620 can also be used to store a preset fifth audio signal.

In some embodiments, the control unit 630 may also receive various control instruments or status information through the communication unit 610, so as to determine whether a call request is received, whether the local audio is allowed to be played, whether the listening is allowed, whether the talking is allowed, whether to hang up and so on. Of course, referring to the above mentioned embodi-ments, the input unit may be used to receive part or all of the control instruments.

The communication device 600 can be used in various electronic devices that can support voice calls, such as mobile phones, tablet computers, telephones, call watches, Bluetooth headsets, etc., so as to realize the communication method that can perform a function of checking local sound effect.

Figure 7:
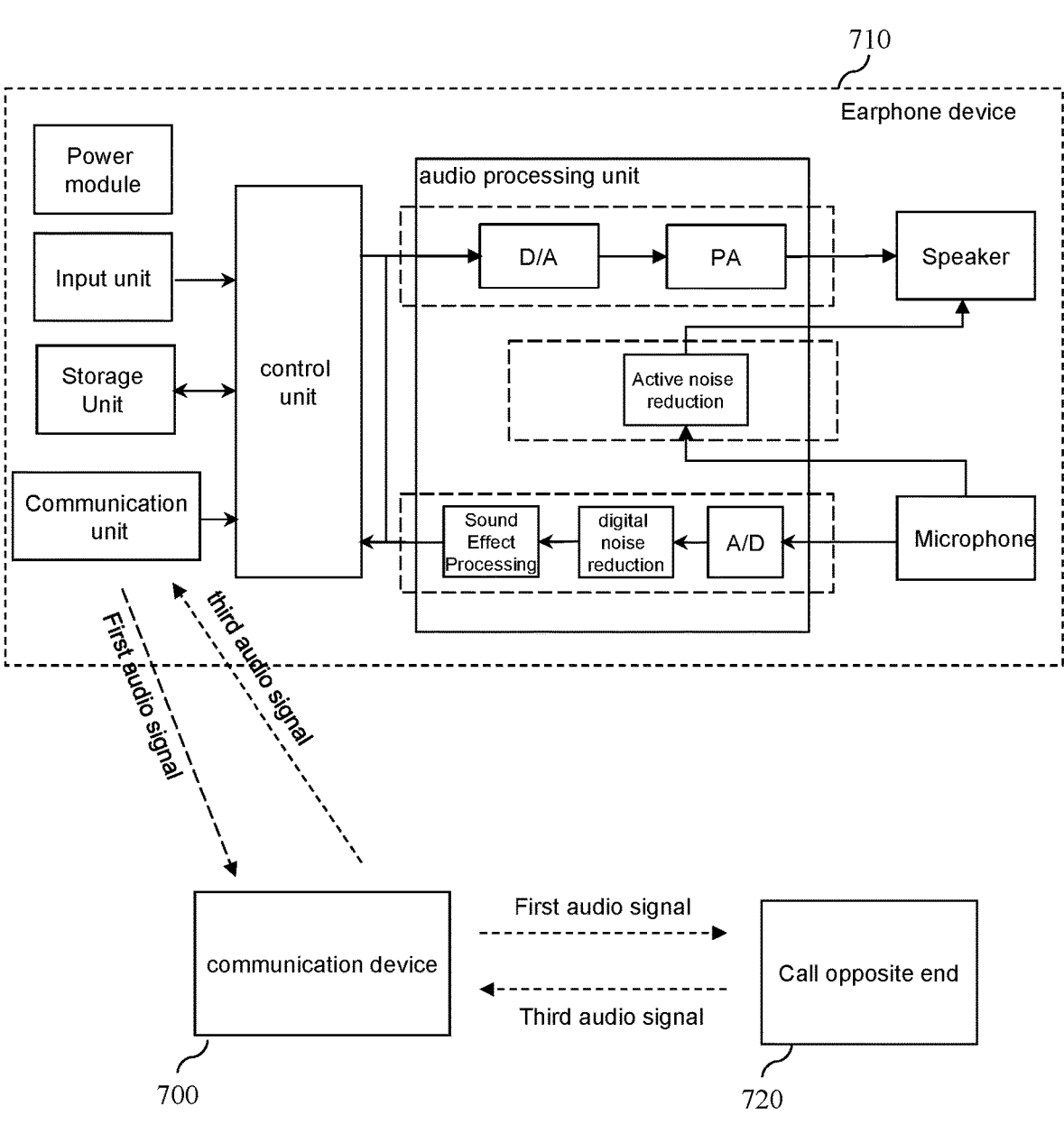
FIG. 7 is a schematic structural diagram of a communication system according to still another embodiment of the present invention.

A communication system is provided in one embodiment of the present invention. The communication system com-prises an earphone device 710 and a communication device 700. As shown in FIG. 7, the communication device 700 communicates with a call opposite end 720 and the earphone device 710 to receive a call request from the call opposite end 720, forward a third audio signal from the call opposite end 720 to the earphone device 710, and forward a first audio signal from the earphone device 710 to the call opposite end 720 during the call. The communication device 700 may receive the call request from the call opposite end 720 (remote party) based on a switched telephone communica-tion network, or may receive the call request from the call opposite end 720 through a computer communication net-work such as the Internet, a local area network, and a short-distance wireless communication network. The call request may be an incoming call, or a voice call request generated by an application (APP) with a voice call function installed in the communication device 700.

In some embodiments, the communication device 700 may be various electronic devices that can realize voice calls, such as fixed phones, mobile phones, smart phones, tablets, personal computers, handheld computers, PDAs, and etc. In a specific implementation, the communication device 700 comprises one or more processors and a memory. The memory stores one or more programs configured to be executed by the one or more processors. The one or more programs comprise instructions for implementing the com-munication methods described above. The communication device 700 may also be implemented in hardware, software, or a combination of both, including one or more signal processing circuits and/or application specific integrated circuits.

The communication device 700 further comprises a com-munication unit, so that the earphone device 710 can estab-lish a wired or wireless communication connection with the communication device 700, and the communication device 700 can establish a communication connection with the call opposite end 720. The communication unit may be a time-division multiplexed wireless communication circuit, or may be two independent communication circuits, which communicate with the earphone device 710 and the call opposite end 720 respectively. The communication unit or communication circuit may be implemented by using related technologies, which is not specifically limited in the present invention.

The specific structure of the earphone device 710 may be the same as or similar to those described in the embodiment of FIG. 1 or FIG. 6, and details are not repeated here. In some embodiments, the communication device 700 sends an incoming call reminder to the earphone device 710 when the call request from the call opposite end 720 is received. When the earphone device 710 receives the incoming call reminder, the earphone device 710 can remind the user in various ways, such as generating vibration or playing music, ringing, and voice, which is not specifically limited here.

The communication device 700 is further configured to receive a control instruction input by a user, and send the control instruction to the earphone device 710. The control instructions may comprise one or more of instructions such as instructions to allow the listening, allow the talking, allow or stop playing the local audio, allow the listening and the call, and hang up. The communication device 700 can receive the control instructions input by the user through a mechanical keyboard, buttons, a mouse, a touch-sensitive display screen, and voice recognition. In some embodiments, the communication device 700 may also receive the above mentioned control instructions sent by the earphone device 710 and input by the user on the earphone device 710.

The communication device 700 receives the third audio signal from the call opposite end 720 and forwards it to the earphone device 710 in response to the instruction to allow the listening. The call device 700 receives the first audio signal from the earphone device 710, and forwards it to the call opposite end 720 in response to the instruction to allow the talking.

The communication device 700 receives the third audio signal from the call opposite end 720, forwards the third audio signal to the earphone device 710, receives the first audio signal from the earphone device 710 and forwards the first audio signal to the call opposite end 720 in response to the instruction to allow the listening and the call.

When the talking is not allowed, in response to the instruction to allow playing the local audio, the communication device 700 enters a sound effect check state. In the sound effect check state, the communication device 700 does not transmit the audio signal to the call opposite end, or transmits a preset ringtone to the call opposite end 720. For example, a fifth audio signal sent by the earphone device 710 can be regarded the preset ringtone. In addition, the preset ringtone may be pre-stored in the communication device 700. In this way, the discomfort caused by the caller's failure to listen to the user's voice in time can be reduced. In some embodiments, the communication device 700 also stops sending the preset ringtone to the call opposite end 720 in response to the instruction to stop playing the local audio.

In some embodiments, the communication device 700 ends the call with the call opposite end 720 in response to the instruction to hang up. It should be understood that, after receiving the audio signal from the call opposite end 720 or the earphone device 710, the communication device 700 can process or encode the received audio signal according to its internal preset audio processing flow or communication protocol, and then send it out. The present invention does not specifically limit the preset audio processing flow or communication protocol.

In some embodiments, the communication device 700 has a display for displaying one or more call interfaces. At least one call interface is configured to display an enabling indication representing whether the local audio is allowed to be played. The communication device 700 receives a user input indicating a selection of whether the local audio is allowed to be played on the call interface, and enters a sound effect check state in response to the user input indicating the selection that the local audio is allowed to be played when the call is not allowed. In the sound effect check state, the communication device 700 does not send the audio signal to the call opposite end, or only sends the preset ringtone to the call opposite end. At this time, the earphone device 710 starts to collect the local audio signal including the local ambient sound after the instruction to allow the local audio to be played, and performs the audio processing before transmission on the local audio signal, so as to obtain the first audio signal. The earphone device 710 performs the audio processing before playback on the first audio signal to obtain the second audio signal, and play the second audio signal.

In some embodiments, the call interface is further configured to display one or more of the enabling indications representing whether listening is allowed, the enabling indication representing whether the talking is allowed, the enabling indication representing whether listening and talking are allowed, and the enabling indication representing whether to hang up. In some embodiment, the number of the call interface is one or more.

The display may be a touch-sensitive display screen. By touching the display screen, the user triggers the enabling indication on the call interface, thereby inputting the selected control instrument. In some embodiments, the communication device 700 is also provided with input modules such as keyboards, keys, voice recognition units, gesture recognition, and face recognition. In this way, the user can use an appropriate input way to trigger the enabling indication on the call interface to input the selected control instrument. It can be understood that, the enabling indication may also be triggered by receiving the control instruction input by the user on the earphone device 710.

The present invention also provides a communication method for the communication device, as shown in FIG. 9 and FIGS. 8A-8C. The communication method comprises following operations. The communication device receives a call request from the call opposite end, and displays a first call interface 800 shown in FIG. 8A at 900.

The first call interface 800 comprises one enabling indication showing whether the listening is allowed. For example, an icon 803 shown in FIG. 8A is the enabling indication showing whether the listening is allowed. The first call interface may further comprise one enabling indication showing whether to hang up. For example, the icon 802 shown in FIG. 8A is the enabling indication showing whether to hang up. In some specific implementations, the enabling indication showing whether to hang up may be displayed on one or more call interfaces, so that the user can choose to hang up at any time. For example, when the sound effect to be sent to the call opposite end is confirmed to be not the desired effect, and it is not suitable to connect the call at present, the user can choose to hang up at any time.

The first call interface may also display incoming call reminder information, such as incoming call number, incoming call contact information, listening status information, and the like. In one embodiment, the communication device 700 may send an incoming call reminder or forward a call request to the earphone device 710 to notify the earphone device 710 of receiving the call request.

At 901, the communication device waits to receive user input on the first call interface. The communication device may receive the user input by the user on the communication device, and may also receive the user input forwarded by the earphone device. The user can trigger the corresponding enabling indication by operating the communication device to input the user input representing his selection, or can input the control instruction by operating the earphone device, so that the corresponding enabling indication on the call interface is considered to be triggered. In this way, the communication device is caused to receive the user input representing the user selection.

At 902, the communication device receives a first user input indicating that listening is allowed, and displays a second call interface in response to the first user input. The second call interface 810 shown in FIG. 8B comprises one enabling indication showing whether the local audio is allowed to be played, and may also comprise one enabling indication showing whether the talking is allowed.

In FIG. 8B, the icon 804 indicates that the local audio is allowed to be played, and the icon 805 indicates that the talking is allowed. In other embodiments, the two icons can be combined into one icon, and different enabling indications can be distinguished by the order of selecting or the number of consecutive inputs. For example, the first input of the user means the enabling indication that the local audio is allowed to play, and the second input of the user means the enabling indication that the local audio is stopped and the talking is allowed. The above enabling indications may also be represented by a greater number of icons. When the first user input is input on the communication device by the user, the communication device also sends the instrument that the listening is allowed to the earphone device 710.

The communication device 700 also allows the listening of the incoming call in response to the first user input. That is, the third audio signal from the call opposite end is received and forwarded to the earphone device 710. However, at this time, the communication device 700 does not send the audio signal to the call opposite end, so as to prevent the call opposite end from hearing the local sound of the communication device 700.

At 903, the communication device waits for another user input on the second call interface. At 904, the communication device receives a second user input indicating the selection that the local audio is allowed to be played is on the second call interface, and enters a sound effect check state in response to the second user input. In the sound effect check state, the communication device does not send the audio signal to the call opposite end, or only sends the preset ringtone to the call opposite end. In addition, the communication device continues to wait for another user input on the second call interface, and maintains or exits the sound effect check state according to the user's input instruction. The communication device can also exit the sound effect check state according to the control instruction of the earphone device. If the time of playing the local audio reaches a predetermined time, an exit instruction may be sent to the headphone device.

When the second user input is input by the user on the communication device, the communication device also sends the instruction that the local audio is allowed to be played to the earphone device 710, so that the earphone device 710 can play the local audio. That is, the earphone device 710 obtains the local audio signal including the local environmental sound, and performs the audio processing before transmission to obtain the first audio signal, and performs the audio processing before playback on the first audio signal to obtain the second audio signal, and the second audio signal is played through the speaker, so that the user can check the sound effect of the first audio signal to be sent to the call opposite end.

At 905, the communication device receives a third user input indicating the selection that the talking is allowed on the second call interface, and displays a third call interface in response to the third user input. The third call interface 820 shown in FIG. 8C is used to display the state of the normal call between the user and the call opposite end, which may comprise one enabling indication representing whether to hang up, call state reminder information, caller contact information, call Information related to the current call, and other information related to the current call. In some embodiments, the third call interface may further comprise one enabling indication showing whether the local audio is allowed to be played, so as to provide the user with a function of checking the current sound effect at any time.

In response to the third user input, the call device 700 further receives the first audio signal from the headset device 710 and forwards it to the call opposite end 720. At the same time, the third audio signal from the call opposite end 720 is continued to be received and forwarded to the earphone device 710, thereby realizing a normal two-way call.

In some specific embodiments, the enabling indication representing whether the talking is allowed can also be used to stop playing local audio. In response to the third user input, the call device 700 stops sending the preset ringtone while the talking is allowed.

At 906, the call ends. This operation may be performed on any of the aforementioned call interfaces. Because the user input indicating to hang up is received, this operation is performed to end the call.

The communication method provided in this embodiment changes the traditional call interface and the communication method, and divides answering of the call into two separate operations, i.e., listening and talking. It is more conducive to the user to make a more secure decision before connecting the call.

Figure 9:
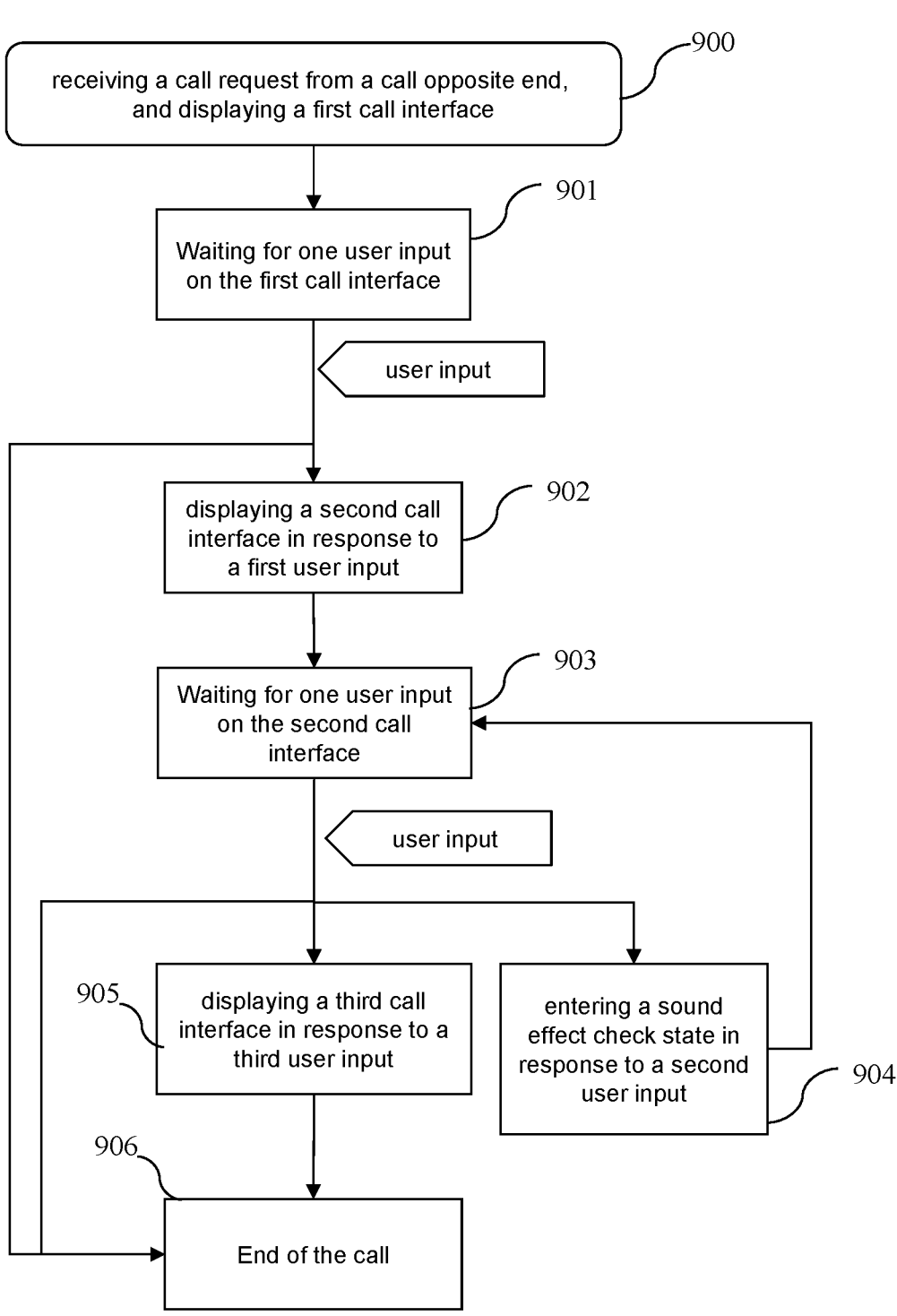
FIG. 9 is a schematic flowchart showing a communication method according to one embodiment of the present invention.

It can be understood that, when the communication device 700 executes the communication method process shown in FIG. 9 with reference to the call interfaces shown in FIG. 8A to FIG. 8B, the earphone device 710 can execute the communication method shown in FIG. It is not repeated here.

Figures 10A, 10B, 10C:
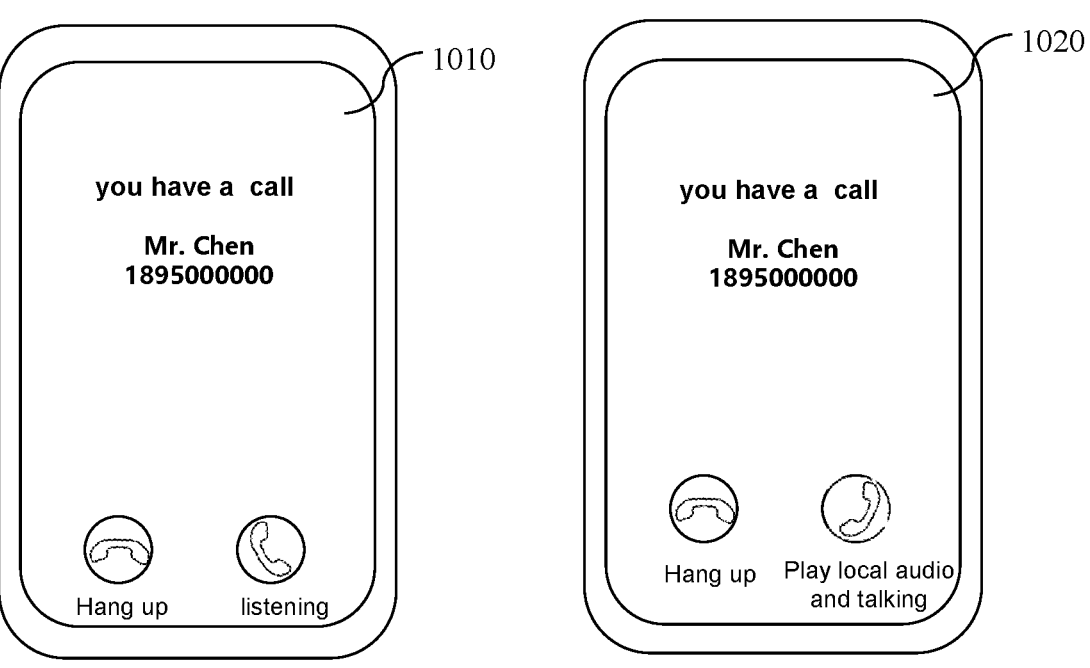
FIG. 10A to 10C are schematic diagrams showing a second type of call interfaces displayed by the communication device according to one embodiment of the present invention.
Figure 12:
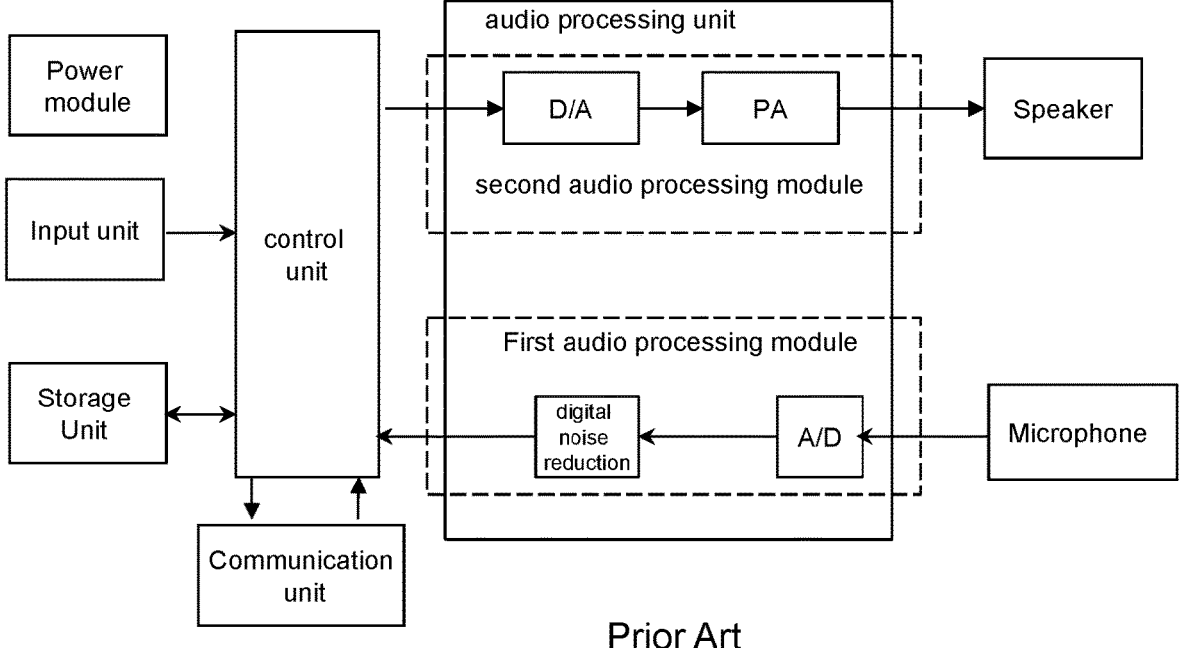
FIG. 12 is a schematic structural diagram showing an earphone device in the related art.

FIG. 10A to 10C show another communication method of the communication device of the present invention. After the fourth call interface 1010 shown in FIG. 10A, which can be the same as the interface 800, receives the user input representing the selection that the listening is allowed, the fifth call interface 1020 shown in FIG. 10B is entered, and the third audio signal from the call opposite end is forwarded to the earphone device. The fifth call interface at least comprises one enabling indication representing whether the local audio and the talking are allowed. After the user input indicating that the local audio and the call are allowed is received in the fifth call interface, the sixth call interface 1030 shown in FIG. 10C is entered. On the sixth call interface, the communication device 700 enters the normal call state. That is, it continues to receive the third audio signal from the call opposite end and forwards it to the earphone device, and simultaneously receives the first audio signal from the earphone device and forwards it to the call opposite end. However, at this time, the earphone device 710 also performs the audio processing before playback on the first audio signal and then plays the second audio signal through the speaker. The sixth call interface may also display one enabling indication representing whether playing of the local audio is stopped, which is used to receive the control instruction input by the user to stop the playing of the local audio at any time in the normal call state. It can be understood that, corresponding to this embodiment, the earphone device 710 may execute the communication method shown in FIG. 3, which will not be repeated here.

FIG. 11A to 11C show yet another embodiment of the communication method of the communication device of the present invention. When the communication device receives the call request from the call opposite end, a seventh call interface 1110 shown in FIG. 11A is displayed.

The seventh call interface 1110 comprises one enabling indication showing whether listening and talking are allowed, such as the icon 1102 shown in in FIG. 11A, and one enabling indication showing whether a local audio is allowed to be played, such as the icon 1101 shown in FIG. 11A.

The communication device displays an eighth call interface 1120 shown in FIG. 11B after the user input indicating the selection that the local audio is allowed is received on the seventh call interface 1110, and enters the sound effect check state. In the sound effect check state, the communication device does not receive the audio signal from the call opposite end and does not send the audio signal to the call opposite end. The earphone device 710 plays the second audio signal obtained based on the first audio signal.

After the user input indicating the selection that the listening and the talking are allowed is received on the seventh call interface 1110, the communication device displays a ninth call interface 1130 shown in FIG. 11C, which can be the same as or similar to the interface 820 shown in FIG. 8C, and enter the normal call state with the call opposite end. That is, the first audio signal from the earphone device 710 is received and forwarded to the call opposite end 720. The third audio signal from the call opposite end 720 is received and forwarded to the earphone device 710, thereby realizing a normal two-way conversation.

The eighth call interface 1120 may comprise one enabling indication representing whether listening and talking are allowed, and may also comprise prompt information indicating that the user is in the sound effect check state currently, information related to the current incoming call, and the like. After the user input indicating that the selection that listening are and talking are allowed is received in the second call interface 1120, the communication device exits the sound effect check state, displays the ninth call interface 1130, and enters the normal call state with the call opposite end.

It can be understood that, the call interface may refer to all the interfaces displayed on the display screen, and may also be part of the interfaces contained therein. The switching between the call interfaces may be switching of all interfaces, switching of part of the interfaces, or switching of each enable indication.

It can be understood that, the earphone device 710 executes the communication method shown in FIG. 4 with reference to the call interfaces shown in FIG. 11A to FIG. 11C. A nonvolatile computer-readable medium is provided according to one embodiment of the present invention. The nonvolatile computer-readable medium stores one or more programs executed by at least one processor. The programs, when executed by the processor, causes the at least one processor to perform: displaying a first enabling indication representing whether a local audio is allowed to be played; entering a sound effect check state in response to a user input indicating a selection that the local audio is allowed to be played when talking is not allowed; transmitting a preset ringtone or not transmitting an audio signal to a call opposite end in the sound effect check state; and transmitting an audio signal obtained based on a local audio signal to the call opposite end when the talking is allowed. The "local" mentioned in this document refers to the user end relative to the remote party of the call, and the local audio signal is an audio signal collected in real time at the user end. After the talking is allowed, the audio signal sent to the remote party, such as the first audio signal, is obtained by collecting the local audio signal during the normal call process.

In one embodiment, the programs, when executed by at least one processor, causes the at least one processor to further perform: controlling to display a second enabling indication representing whether listening is allowed; receiving an audio signal from the call opposite end in response to one user input indicating a selection that the listening is allowed.

In one embodiment, the program, when executed by at least one processor, causes the at least one processor to further perform: controlling to display a third enabling indication representing whether the talking is allowed; transmitting the audio signal obtained based on the local audio signal to the call opposite end in response to one user input indicating the selection that the talking is allowed.

In one embodiment, the program, when executed by at least one processor, causes the at least one processor to further perform: controlling to display a fourth enabling indication representing whether the local audio are allowed to be played and the call are allowed; receiving audio signal from the call opposite end, and sending the audio signal obtained based on the local audio signal to the call opposite end in response to one user input representing the selection that the local audio are allowed to be played and the call are allowed.

In one embodiment, the program, when executed by at least one processor, causes the at least one processor to further perform: controlling to display one or more call interfaces comprising one or more of a first enabling indication, a second enabling indication, a third enabling indication, and a fourth enabling indication.

The present invention also provides a smart phone. The smart phone comprises at least one processor; a memory for storing programs and data; a transceiver for wireless communication to realize a voice call; a display screen for displaying a call interface.

The at least one processor, the memory, the transceiver, and the display screen communicate via a bus. The program, when executed by at least one processor, causes the at least one processor to perform: displaying a first enabling indication representing whether a local audio is allowed to be played; entering a sound effect check state in response to a user input indicating a selection that the local audio is allowed to be played when a call is not allowed; transmitting a preset ringtone or not transmitting an audio signal to a call opposite end in the sound effect check state; transmitting an audio signal obtained based on a local audio signal to the call opposite end when the talking is allowed. The "local" mentioned in this document refers to the user end relative to the other end of the call, and the local audio signal is an audio signal collected in real time at the user end. After the talking is allowed, that is, during the normal call process, the audio signal sent to the caller is obtained by collecting the local audio signal, such as the first audio signal in the foregoing embodiment, etc.

In one embodiment, the programs, when executed by at least one processor, causes the at least one processor to further perform: controlling to display a second enabling indication representing whether listening is allowed; receiving an audio signal from the call opposite end in response to one user input indicating a selection that the listening is allowed.

In one embodiment, the program, when executed by at least one processor, causes the at least one processor to further perform: controlling to display a third enabling indication representing whether the talking is allowed; transmitting the audio signal obtained based on the local audio signal to the call opposite end in response to one user input indicating the selection that the talking is allowed.

In one embodiment, the program, when executed by at least one processor, causes the at least one processor to further perform: controlling to display a fourth enabling indication representing whether the local audio are allowed to be played and the call are allowed; receiving audio signal from the call opposite end, and sending the audio signal obtained based on the local audio signal to the call opposite end in response to one user input representing the selection that the local audio are allowed to be played and the call are allowed.

Those skilled in the art should be aware that the embodiments of this application may be methods, systems, or computer program products. Accordingly, the present application may take the form of a complete hardware embodiment, a complete software embodiment, or an embodiment in conjunction with software and hardware aspects. Furthermore, the present application may take the form of a computer program product implemented on one or more computer-available storage media (comprising, but not limited to, disk memory, CD-ROM, optical memory, etc.) containing computer-available program code.

The present application is described with reference to methods, equipment (systems), and flow charts and/or block diagrams of computer program products according to the embodiment of the present application. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present application have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

What is claimed is:

1. An earphone device comprising:
a microphone;
a speaker;
a communication circuit;
an audio processing circuit including a first audio processing circuit for processing an audio signal to be transmitted and a second audio processing circuit for processing an audio signal to be played back, the first audio processing circuit configured for receiving an audio signal collected by the microphone, and outputting a first audio signal to the communication circuit and the second audio processing circuit, the second audio processing circuit configured for receiving the first audio signal, and outputting a second audio signal to the speaker; and
a control circuit configured for detecting whether a local audio is allowed to be played, and detecting whether talking is allowed after a call request from an external device is detected,
wherein when the local audio is allowed to be played and/or the talking is allowed, the microphone is controlled to collect a local audio signal comprising a local ambient sound, and the first audio processing circuit performs audio processing on the local audio signal to output the first audio signal;
when the local audio is allowed to be played, the second audio processing circuit is controlled to perform audio processing on the first audio signal to output the second audio signal, and the speaker is controlled to play the second audio signal so as to check a sound effect to be perceived at the external device, and
when the talking is allowed, the communication circuit is controlled to transmit the first audio signal to the external device,
wherein, after the call request from the external device is detected, the control circuit is configured for first detecting whether listening is allowed, and then detecting whether the local audio is allowed to be played and whether the talking is allowed, or the control circuit is configured for first detecting whether the local audio is allowed to be played, and then detecting whether listening and talking are allowed, and
wherein, after the listening is allowed, when the local audio is detected as allowed to be played but whether the talking is allowed is not detected, the communication circuit is controlled to transmit a preset fifth audio signal.

2. The earphone device according to claim 1, wherein the first audio processing circuit is configured to perform audio processing before transmission on the input audio signal, and the audio processing before transmission comprises one or more of analog-to-digital conversion, digital noise reduction, dual microphone noise reduction, and sound effect processing; the second audio processing circuit is configured to perform audio processing before playback on the input audio signal, and the audio processing before playback comprises one or more of digital-to-analog conversion, power amplification, and volume adjustment.

3. The earphone device according to claim 1, wherein the detecting whether the local audio is allowed to be played and whether the talking is allowed comprises:

detecting whether the local audio is allowed to be played firstly;

controlling the speaker to play the second audio signal when the local audio is allowed to be played until a time of playing the local audio reaches a predetermined time or an instruction to stop playing the local audio is received; and detecting whether the talking is allowed when the local audio is not allowed to be played or playing of the local audio is stopped; or, the detecting whether the local audio is allowed to be played and whether the talking is allowed comprises:

detecting whether the local audio is allowed to be played and whether the talking is allowed simultaneously; and controlling the first audio processing circuit to output the first audio signal, controlling the communication circuit to transmit the first audio signal to the external device, and controlling the speaker to play the second audio signal when the local audio is allowed to be played and the talking is allowed.

4. The earphone device according to claim 1, wherein the listening is allowed, the communication circuit is controlled to receive a third audio signal from the external device, and output the third audio signal to the second audio processing circuit, the second audio processing circuit performs audio processing before playback on the third audio signal to obtain a fourth audio signal, and the speaker is controlled to play the fourth audio signal;

when the listening and talking are allowed, the communication circuit is controlled to receive the third audio signal from the external device, and outputs the third audio signal to the second audio processing circuit, the second audio processing circuit performs audio processing before playback on the third audio signal to obtain the fourth audio signal, the speaker is controlled to play the fourth audio signal, and the communication circuit is controlled to transmit the first audio signal to the external device.

5. The earphone device according to claim 1, wherein the speaker comprises a left channel speaker and a right channel speaker, and when the second audio signal and the fourth audio signal need to be played simultaneously, one of the left channel speaker and the right channel speaker is configured to play the second audio signal, and the other of the left channel speaker and the right channel speaker is configured to play the fourth audio signal.

6. The earphone device according to claim 1, wherein the earphone device establishes a wireless communication link with the external device based on a wireless technology.

7. The earphone device according to claim 1, wherein the microphone comprises a main microphone arranged near user's lips and a noise reduction microphone positioned away from the user's lips;

the audio processing circuit further comprises an active noise reduction circuit, which is configured to analyze a noise audio signal collected by the noise reduction microphone, generate a noise reduction signal with an opposite phase to the noise audio signal, and play the noise reduction signal through the speaker.

8. The earphone device according to claim 1, further comprising:

an input circuit configured to receive one or more control instructions input by a user, the control instructions comprising instructions to allow listening, allow talking, and allow or stop playing of the local audio;

a storage circuit configured for storing system operation data and/or a preset fifth audio signal;

an encoding circuit configured to encode the first audio signal and output the encoded first audio signal to the communication circuit for transmission; and a decoding circuit configured to decode a third audio signal from the external device received by the communication circuit and output the decoded third audio signal to the second audio processing circuit.

9. A method for communication in an earphone device, comprising:

collecting, by a microphone, a local audio signal comprising a local ambient sound, and performing audio processing before transmission on the local audio signal to obtain a first audio signal when a local audio is allowed to be played and/or talking is allowed;

performing audio processing before playback on the first audio signal to obtain a second audio signal, and playing the second audio signal when the local audio is allowed to be played so as to check a sound effect to be perceived at the external device;

transmitting the first audio signal to an external device when the talking is allowed, wherein the audio processing before transmission comprises one or more of analog-to-digital conversion, digital noise reduction, dual microphone noise reduction, and sound effect processing, and the audio processing before playback comprises one or more of digital-to-analog conversion, power amplification, and volume adjustment, wherein after the listening is allowed, when the local audio is detected as allowed to be played but whether the talking is allowed is not detected, a preset fifth audio signal is transmitted to the external device.

10. A communication device, comprising:

one or more processors, a memory and a communication circuit, wherein the communication device communicates with a call opposite end and an earphone device according to claim 1 respectively, the communication device receives one or more control instructions after a call request from the call opposite end is received; the communication device enters a sound effect check state in response to one control instruction to allow the local audio to be played when talking is not allowed;

the communication device does not transmit audio signal to the call opposite end, or transmits a preset ringtone to the call opposite end in the sound effect check state;

a first audio signal from the earphone device is forwarded to the call opposite end when the talking is allowed.

11. The communication device according to claim 10, wherein the communication device receives a third audio signal from the call opposite end and forwards the third audio signal to the earphone device in response to one control instruction to allow listening after the call request from the call opposite end is received.

12. The communication device according to claim 10, wherein the communication device receives the first audio signal from the earphone device and forwards the first audio signal to the call opposite end in response to one control instruction to allow talking after the call request from the call opposite end is received.

13. The communication device according to claim 10, further comprising:

a display device to display one or more call interfaces, wherein the call interfaces are configured to display at least one or more enabling indications representing whether the listening is allowed, whether the talking is allowed, and whether the local audio is allowed to be played.

14. The method according to claim 9, further comprising:

detecting whether listening is allowed firstly, and then detecting whether the local audio is allowed to be played and whether the talking is allowed after a call request from the external device is detected; or detecting whether the local audio is allowed to be played firstly, and then detecting whether the listening and the talking are allowed after the call request from the external device is detected.

15. The method according to claim 9, wherein the detecting whether the local audio is allowed to be played and whether the talking is allowed comprises:

detecting whether the local audio is allowed to be played firstly; playing the second audio signal when the local audio is allowed to be played until a time of playing the local audio reaches a predetermined time or an instruction to stop playing the local audio is received; and detecting whether the talking is allowed when the local audio is not allowed to be played or playing of the local audio is stopped; or, the detecting whether the local audio is allowed to be played and whether the talking is allowed comprises:

detecting whether the local audio is allowed to be played and whether the talking is allowed simultaneously; and performing audio processing before playback on the first audio signal, and playing the second audio signal, and transmitting the first audio signal to the external device when the local audio is allowed to be played and the talking is allowed.

16. The method according to claim 9, further comprising:

receiving a third audio signal from the external device, performing audio processing before playback on the third audio signal to obtain a fourth audio signal, and playing the fourth audio signal when the listening is allowed; and receiving the third audio signal from the external device, performing audio processing before playback on the third audio signal to obtain the fourth audio signal, playing the fourth audio signal, and transmitting the first audio signal to the external device when the listening and the talking are allowed.

\* \* \* \* \*